US012585753B2

(12) United States Patent (10) Patent No.: US 12,585,753 B2
Ahmed et al. (45) Date of Patent: Mar. 24, 2026

(54) VALIDATED MOVEMENT OF SHARED IHS HARDWARE COMPONENTS

(71) Applicant: Dell Products, L.P., Round Rock, TX (US)

(72) Inventors: A Anis Ahmed, Bangalore (IN); Jason Matthew Young, Round Rock, TX (US); Pallavi Satpathy, Bhubaneswar (IN)

(73) Assignee: Dell Products, L.P., Round Rock, TX (US)

( * ) Notice: Subject to any disclaimer, the term of this patent is extended or adjusted under 35 U.S.C. 154(b) by 115 days.

(21) Appl. No.: 18/509,562

(22) Filed: Nov. 15, 2023

(65) Prior Publication Data

US 2025/0156518 A1 May 15, 2025

(51) Int. Cl.
G06F 21/44 (2013.01)
(52) U.S. Cl.
CPC .................................... G06F 21/44 (2013.01)
(58) Field of Classification Search
CPC ... G06F 15/161; G06F 21/44; H04L 41/0853; H04L 41/0856; H04L 41/0866; H04L 41/0869; H04L 41/0873
See application file for complete search history.

(56) References Cited

U.S. PATENT DOCUMENTS

| | | | |
|---|---|---|---|
| 2017/0195187 A1* | 7/2017 | Bennett | H04L 41/0813 |
| 2018/0288011 A1* | 10/2018 | Marquardt | H04L 63/0823 |
| 2019/0089594 A1* | 3/2019 | Jubran | H04L 41/0856 |
| 2019/0236279 A1* | 8/2019 | Depew | G06F 9/44505 |
| 2020/0241926 A1* | 7/2020 | Guim Bernat | G06F 9/5044 |

* cited by examiner

*Primary Examiner* — Olugbenga O Idowu
(74) *Attorney, Agent, or Firm* — Fogarty LLP

(57) ABSTRACT

Systems and methods are provided validating the movement of hardware components of a chassis that are shared by multiple IHSs (Information Handling Systems), such as rack-mounted servers. During factory provisioning of the IHS, a factory-signed inventory certificate is uploaded to each IHS that identifies factory-installed hardware of the IHS and that also identifies any known hardware components that are shared by the IHS. This inventory certificate is used to validate that the detected hardware of the IHS is genuine factory-installed hardware. During such validations by IHSs installed in a chassis, an inventory of shared chassis hardware components is constructed. When a discrepancy is detected during these validations, the IHS notifies a chassis management controller in order to determine whether the discrepancy is caused by movement of a shared hardware component of the chassis.

20 Claims, 8 Drawing Sheets

200

300

400

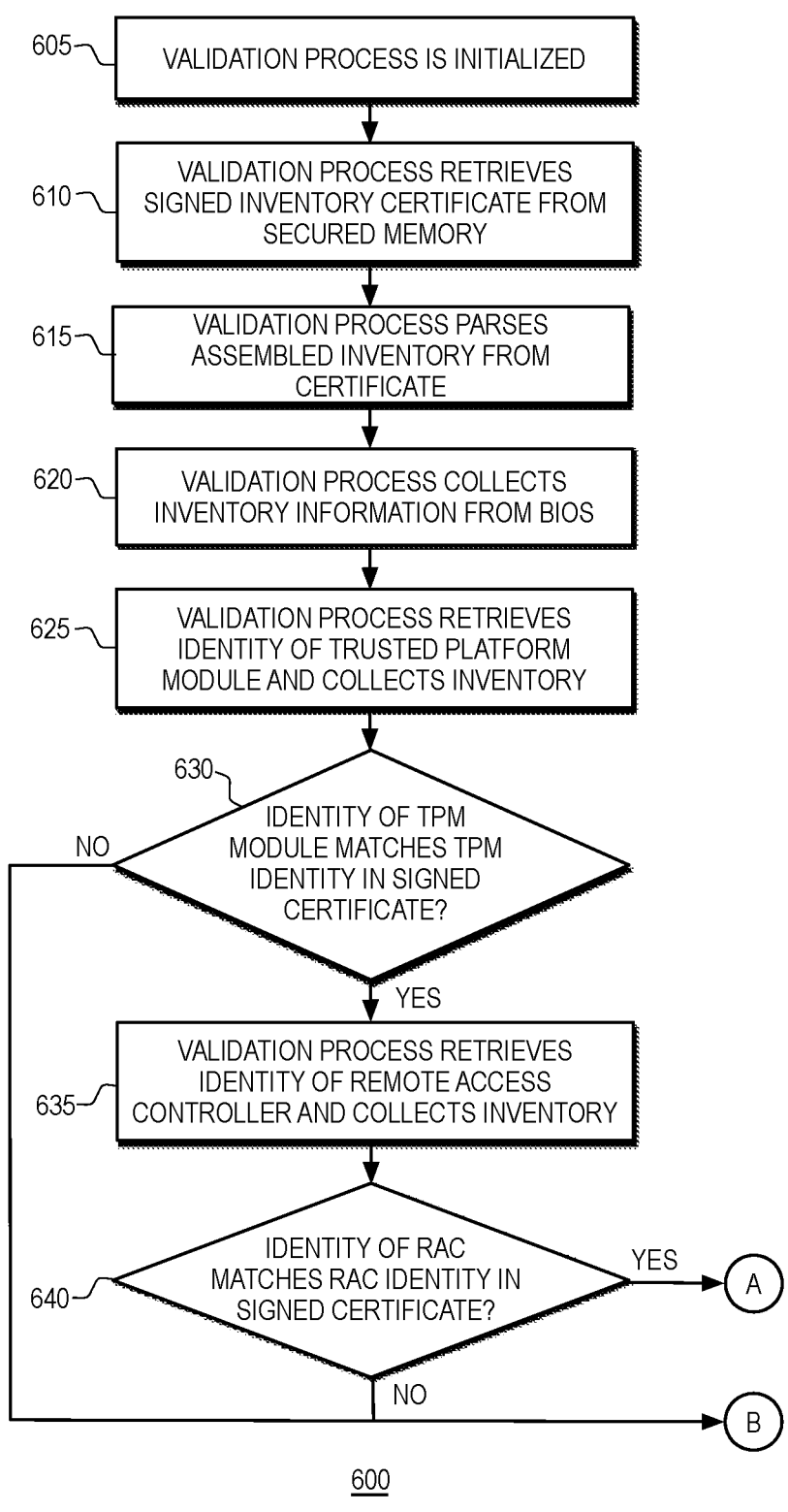

605 — VALIDATION PROCESS IS INITIALIZED

610 — VALIDATION PROCESS RETRIEVES SIGNED INVENTORY CERTIFICATE FROM SECURED MEMORY

615 — VALIDATION PROCESS PARSES ASSEMBLED INVENTORY FROM CERTIFICATE

620 — VALIDATION PROCESS COLLECTS INVENTORY INFORMATION FROM BIOS

625 — VALIDATION PROCESS RETRIEVES IDENTITY OF TRUSTED PLATFORM MODULE AND COLLECTS INVENTORY

630 — IDENTITY OF TPM MODULE MATCHES TPM IDENTITY IN SIGNED CERTIFICATE?

NO

YES

635 — VALIDATION PROCESS RETRIEVES IDENTITY OF REMOTE ACCESS CONTROLLER AND COLLECTS INVENTORY

640 — IDENTITY OF RAC MATCHES RAC IDENTITY IN SIGNED CERTIFICATE?

YES — Ⓐ

VALIDATED MOVEMENT OF SHARED IHS HARDWARE COMPONENTS

FIELD

The present disclosure relates generally to Information Handling Systems (IHSs), and relates more particularly to supporting secure modifications to IHSs.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Groups of IHSs may be housed within data center environments. A data center may include a large number of IHSs, such as enterprise-class servers that are stacked and installed within racks. A data center may include large numbers of such racks that may be organized into rows, where the servers installed in each rack may be outwardly very similar looking, such that it may be difficult for administrators to effectively keep track of the configurations and capabilities of any individual server in the data center. Moreover, administration of such large groups of servers may require teams of remote and local administrators working in shifts in order to support around-the-clock availability of the data center operations, while also minimizing any downtime. Each server IHS within a data center may support a wide variety of possible hardware and software configurations. For instance, each individual server IHS may be manufactured accordingly to customized hardware and software configurations requested by a customer. Once an IHS has been received and deployed, a customer may make modifications to the hardware and software of the IHS in order to adapt it for a particular computing task or a particular physical environment. In a data center environment, hardware components may be switched between IHSs, such as between rack-mounted servers.

SUMMARY

In various embodiments, systems and methods may include a first IHS installed in a chassis, where the IHS is configured to: validate hardware detected by the first IHS as factory-installed based on an inventory specified in a first factory-provisioned inventory certificate; and notify a chassis controller when the hardware detected by the first IHS is validated as factory-installed based on the first inventory certificate; a second IHS installed in the chassis, wherein the second IHS is configured to: validate hardware detected by the second IHS as factory-installed based on an inventory specified in a second factory-provisioned inventory certificate; and notify the chassis controller when the hardware detected by the second IHS is validated as factory-installed based on the second inventory certificate; and the chassis comprising a plurality of chassis hardware components and further comprising the chassis controller that is configured to: based on the notifications of validated hardware by the first IHS and the second IHS, maintain an inventory of chassis hardware components that are shared by the first IHS and the second IHS; and in response to a notification of a failure to validate detected hardware as factory-installed by the first IHS or the second IHS, use the inventory to determine when the validation failure is due to movement of a chassis hardware component that is shared.

In some embodiments, the first IHS if further configured to: notify the chassis controller when the hardware detected by the first IHS is not validated as factory-installed. In some embodiments, the notification specifies a missing factory-installed hardware component that was not detected. In some embodiments, the notification specifies an unrecognized hardware component that is not a factory-installed hardware component of the first IHS. In some embodiments, the first IHS is configured to halt further booting upon notifying the chassis controller of the hardware detected by the first IHS that is not validated as factory-installed. In some embodiments, the first IHS is configured to continue booting when notified by the chassis controller that the hardware detected by the first IHS is not validated due to movement of a chassis hardware component that is shared. In some embodiments, the first IHS is configured to generate a delta certificate when notified by the chassis controller that the hardware detected by the first IHS as not validated is due to movement of a chassis hardware component that is shared. In some embodiments, the first factory-provisioned inventory certificate is stored to a persistent memory of the first IHS during the factory-provisioning of the first IHS and wherein the second factory-provisioned inventory certificate is stored to a persistent memory of the second IHS during the factory-provisioning of the second IHS. In some embodiments, the chassis controller is configured to query another chassis controller when notified that the hardware detected by the first IHS as not validated is due to the unrecognized hardware component. In some embodiments, the chassis controller determines when the validation failure is due to movement of a chassis hardware component to another chassis based on information provided in response to query to the other chassis controller.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

FIG. 6A is a flowchart describing certain steps of a method, according to some embodiments, for validating the movement of shared chassis hardware components that are utilized by an IHS.

DETAILED DESCRIPTION

Figure 1:
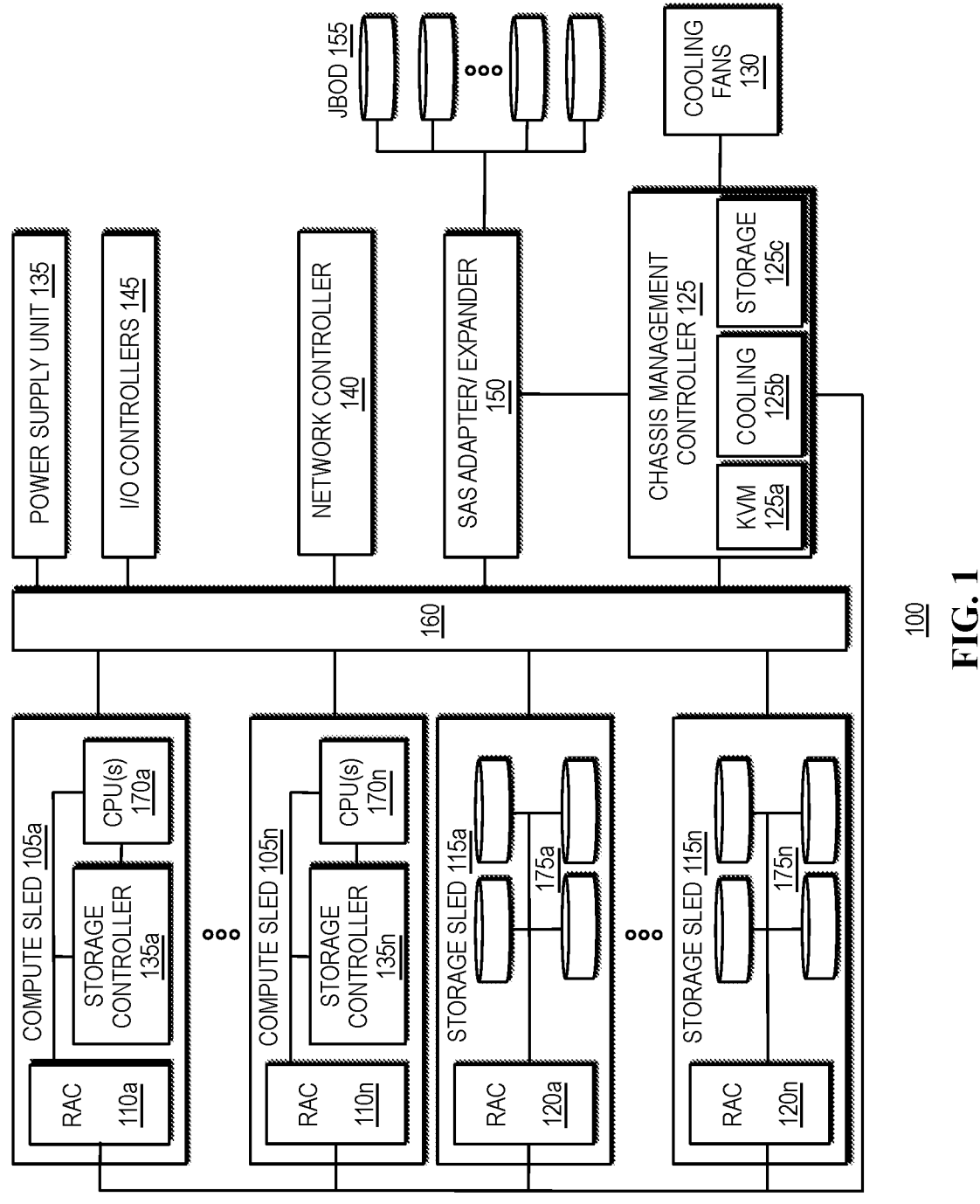
FIG. 1 is a diagram illustrating certain components of a chassis, according to some embodiments, for supporting validation of the movement of shared hardware components of the chassis.

FIG. 1 is a block diagram illustrating certain components of a chassis 100 comprising one or more compute sleds 105*a-n* and one or more storage sleds 115*a-n* that may be configured to implement the systems and methods described herein for validation of the movement of shared hardware components of the chassis 100.

Embodiments of chassis 100 may include a wide variety of different hardware configurations. Such variations in hardware configuration may result from chassis 100 being factory assembled to include components specified by a customer that has contracted for manufacture and delivery of chassis 100. Upon delivery of an chassis 100, the chassis and/or individual IHS sleds installed in the chassis 100, may be modified by replacing various hardware components or by installing new hardware components.

As described in additional detail below, chassis 100 may include capabilities that allow a customer to validate that hardware detected in chassis 100 is the same factory installed and provisioned hardware that was supplied to the customer. In addition, embodiments support secure modifications to chassis 100, such as by an designated administrator that receives the IHS from the manufacturer and may perform hardware customizations to support the requirements of a specific deployment. Over time, administrators may continue to perform customizations to the hardware of chassis 100. In some instances, these administrative operations may involvement movement of hardware components from chassis 100 to another chassis that is also configured according to embodiments. In some instances, these moved hardware components of chassis 100 may be shared hardware components that are actively utilized by more than one IHS (e.g., compute sleds 105*a-n* and storage sleds 115*a-n*) installed in the chassis 100. Embodiments supports validated movement of such shared hardware components, such as transfer of shared hardware from one chassis 100 to another and/or the addition and removal or shared chassis hardware.

Chassis 100 may include one or more bays that each receive an individual sled (that may be additionally or alternatively referred to as a tray, blade, and/or node), such as compute sleds 105*a-n* and storage sleds 115*a-n*. Chassis 100 may support a variety of different numbers (e.g., 4, 8, 16, 32), sizes (e.g., single-width, double-width) and physical configurations of bays. Other embodiments may include additional types of sleds that provide various types of storage and/or processing capabilities. Other types of sleds may provide power management and networking functions. Sleds may be individually installed and removed from the chassis 100, thus allowing the computing and storage capabilities of a chassis to be reconfigured by swapping the sleds with different types of sleds, in many cases without affecting the operations of the other sleds installed in the chassis 100.

Multiple chassis 100 may be housed within a rack. Data centers may utilize large numbers of racks, with various different types of chassis installed in the various configurations of racks. The modular architecture provided by the sleds, chassis and rack allow for certain resources, such as cooling, power and network bandwidth, to be shared by the compute sleds 105*a-n* and storage sleds 115*a-n*, thus providing efficiency improvements and supporting greater computational loads. In some instances, these shared resources of chassis 100 are implemented through hardware components of chassis 100 that are shared by multiple of the compute sleds 105*a-n* and storage sleds 115*a-n* installed in the chassis.

Chassis 100 may be installed within a rack structure that provides all or part of the cooling utilized by chassis 100. For airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air from within the sleds 105*a-n*, 115*a-n* installed within the chassis. A rack and a chassis 100 installed within the rack may utilize various configurations and combinations of cooling fans to cool the sleds 105*a-n*, 115*a-n* and other components housed within chassis 100.

The sleds 105*a-n*, 115*a-n* may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160. In various embodiments, backplane 160 may include various additional components, such as cables, wires, midplanes, backplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140 and power supply unit 135. In some embodiments, a backplane 160 may be uniquely identified based on a code or other identifier that may be permanently encoded in a non-volatile memory of the backplane 160 by its manufacturer. As described below, embodiments may support validation of backplane 160 as being the same backplane that was installed at the factory during the manufacture of chassis 100. In some instances, backplane 160 is detected and utilized by each of the compute sleds 105*a-n* and storage sleds 115*a-n* installed in the chassis 100 such that backplane 160 is a shared component of chassis 100. Embodiments further support secure validation of the movement of shared backplane 160 from one chassis 100 to another chassis that is configured according to embodiments.

Figure 2:
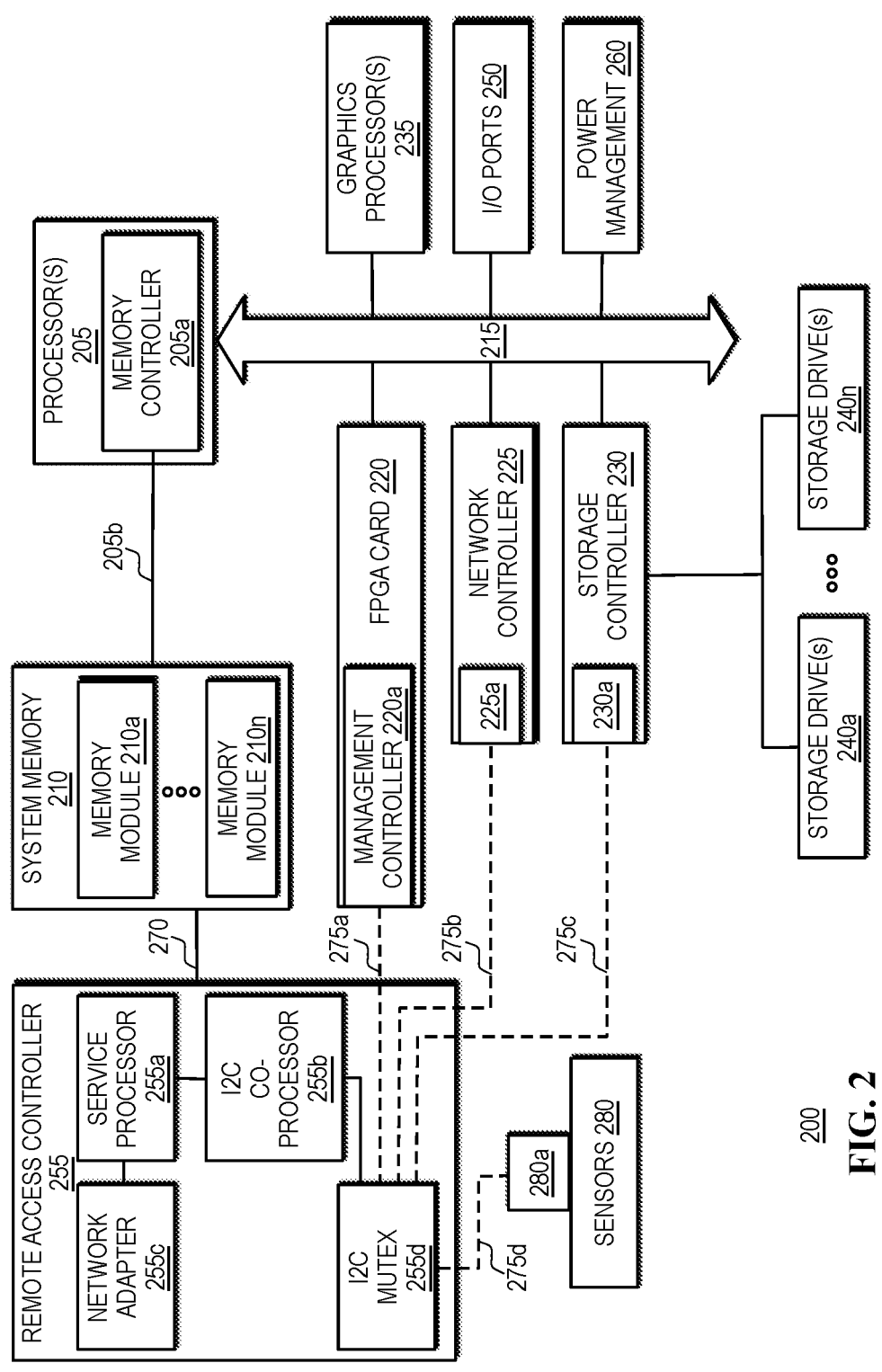
FIG. 2 is a diagram illustrating certain components of an IHS configured, according to some embodiments, for supporting the validation of the movement of shared chassis hardware components that are utilized by the IHS.

In certain embodiments, a compute sled 105a-n may be an IHS such as described with regard to IHS 200 of FIG. 2. A compute sled 105a-n may provide computational processing resources that may be used to support a variety of e-commerce, multimedia, business and scientific computing applications, such as services provided via a cloud implementation. Compute sleds 105a-n are typically configured with hardware and software that provide leading-edge computational capabilities. Accordingly, services provided using such computing capabilities are typically provided as high-availability systems that operate with minimum downtime. As described in additional detail with regard to FIG. 2, compute sleds 105a-n may be configured for general-purpose computing or may be optimized for specific computing tasks.

As illustrated, each compute sled 105a-n includes a remote access controller (RAC) 110a-n. As described in additional detail with regard to FIG. 2, remote access controller 110a-n provides capabilities for remote monitoring and management of compute sled 105a-n. In support of these monitoring and management functions, remote access controllers 110a-n may utilize both in-band and sideband (i.e., out-of-band) communications with various components of a compute sled 105a-n and chassis 100. Remote access controllers 110a-n may collect various types of sensor data, such as collecting temperature sensor readings that are used in support of airflow cooling of the chassis 100 and the sleds 105a-n, 115a-n. In addition, each remote access controller 110a-n may implement various monitoring and administrative functions related to compute sleds 105a-n that utilize sideband bus connections with various internal components of the respective compute sleds 105a-n.

In some embodiments, each compute sled 105a-n installed in chassis 100 may be uniquely identified based on a code or other identifier that may be permanently encoded in a non-volatile memory of a respective compute sled 105a-n by its manufacturer. As described below, during a provisioning phase of the factory assembly of chassis 100, a signed certificate that specifies hardware components of chassis 100, such as through such identifiers of compute sleds 105a-n, that were installed during its manufacture may be stored in a non-volatile memory accessed by a remote access controller 110a-n of a compute sled 105a-n. Using this signed inventory certificate, a customer may validate that the hardware components of chassis 100 are the same components that were installed at the factory during its manufacture. As described in additional detail below, embodiments may further support secure validation of the replacement, removal or addition of individual compute sleds 105a-n, and also supports validation of the replacement, removal or addition of hardware components of chassis 100 that are shared by two more compute sleds 105a-n.

Each of the compute sleds 105a-n may include a storage controller 135a-n that may be utilized to access storage drives that are accessible via chassis 100. Some of the individual storage controllers 135a-n may provide support for RAID (Redundant Array of Independent Disks) configurations of logical and physical storage drives, such as storage drives provided by storage sleds 115a-n. In some embodiments, some or all of the individual storage controllers 135a-n may be HBAs (Host Bus Adapters) that provide more limited capabilities in accessing physical storage drives provided via storage sleds 115a-n and/or via SAS expander 150.

In addition to the data storage capabilities provided by storage sleds 115a-n, chassis 100 may provide access to other shared storage resources that may be installed components of chassis 100 and/or may be installed elsewhere within a rack housing the chassis 100, such as within a storage blade. In certain scenarios, such shared storage resources 155 may be accessed via a shared SAS expander 150 that is coupled to the backplane 160 of the chassis 100. The SAS expander 150 may support connections to a number of shared JBOD (Just a Bunch Of Disks) storage drives 155 that may be configured and managed individually and without implementing data redundancy across the various drives 155. The additional shared storage resources 155 may also be at various other locations within a datacenter in which chassis 100 is installed. Such additional shared storage resources 155 may also be remotely located. In some embodiments, a SAS expander 150 and storage drives 155 may be uniquely identified based on a code or other identifier that may be permanently encoded in a non-volatile memory of the SAS expander 150 or storage drive 155 by its respective manufacturer. In instances where SAS expander 150 and storage drives 155 are factory installed, as described below, embodiments may support validation of SAS expander 150 and storage drives 155 as being the same SAS expander and storage drives that were installed at the factory during the manufacture of chassis 100. As described in additional detail below, embodiments may further support secure validation of the movement, addition or removal of these shared SAS expander 150 and/or individual storage drives 155 from one chassis 100 to another that is also configured according to embodiments.

As illustrated, chassis 100 also includes one or more storage sleds 115a-n that are coupled to the backplane 160 and installed within one or more bays of chassis 200 in a similar manner to compute sleds 105a-n. Each of the individual storage sleds 115a-n may include various different numbers and types of storage devices. For instance, storage sleds 115a-n may include SAS (Serial Attached SCSI) magnetic disk drives, SATA (Serial Advanced Technology Attachment) magnetic disk drives, solid-state drives (SSDs) and other types of storage drives in various combinations. The storage sleds 115a-n may be utilized in various storage configurations by the compute sleds 105a-n that are coupled to chassis 100. As illustrated, each storage sled 115a-n includes a remote access controller (RAC) 120a-n provides capabilities for remote monitoring and management of respective storage sleds 115a-n. In some embodiments, each storage sled 115a-n may be uniquely identified based on a code or other identifier that may be permanently encoded in a non-volatile memory of the respective storage sled 115a-n by its manufacturer. As described below, embodiments support validation of each storage sled 115a-n as being a storage sled that was installed at the factory during the manufacture of chassis 100, and also supports validation of the replacement, removal or addition of hardware components of chassis 100 that are shared by two more storage sleds 115a-n.

As illustrated, the chassis 100 of FIG. 1 includes a shared network controller 140 that provides network access to the sleds 105a-n, 115a-n installed within the chassis. Network controller 140 may include various switches, adapters, controllers and couplings used to connect chassis 100 to a network, either directly or via additional networking components and connections provided via a rack in which chassis 100 is installed. Each of the IHSs (e.g., compute sleds 105a-n and storage sleds 115a-n) installed in chassis 100 may utilize network bandwidth provided by shared network controller 140. In some embodiments, a network controller 140 may be uniquely identified based on a code or other identifier that may be permanently encoded in a non-volatile memory of the network controller 140 by its manufacturer. As described below, embodiments support validation of network controller 140 as being the same network controller that was installed at the factory during the manufacture of chassis 100, and also supports validation of the replacement, removal or addition of shared network controller 140 from chassis 100.

Chassis 100 may similarly include one or more shared power supply units 135 that provides the components of the chassis with various levels of DC power from an AC power source or from power delivered via a power system provided by a rack within which chassis 100 may be installed. In certain embodiments, power supply unit 135 may be implemented within a shared sled that may provide chassis 100 with multiple redundant, hot-swappable power supply units. Each of the IHSs (e.g., compute sleds 105a-n and storage sleds 115a-n) installed in chassis 100 may utilize power provided by shared power supply units 135. In some embodiments, a power supply unit 135 may be uniquely identified based on a code or other identifier that may be permanently encoded in a non-volatile memory of the power supply unit 135 by its manufacturer. As described below, embodiments support validation of power supply unit 135 as being the same power supply unit that was installed at the factory during the manufacture of chassis 100, and also supports validation of the replacement, removal or addition of shared power supply units 135 from chassis 100.

Chassis 100 may also include various shared I/O controllers 140 that may support various shared I/O ports, such as shared USB ports that may be used to support keyboard and mouse inputs and/or video display capabilities. Such shared I/O controllers 145 may be utilized by the chassis management controller 125 to support various KVM (Keyboard, Video and Mouse) 125a capabilities that provide administrators with the ability to interface with the chassis 100. In some embodiments, each I/O controller 140 may be uniquely identified based on a code or other identifier that may be permanently encoded in a non-volatile memory of the respective I/O controller 140 by its manufacturer. As described below, embodiments support validation of I/O controllers 140 as being the same I/O controllers that were installed at the factory during the manufacture of chassis 100, and also supports validation of the replacement, removal or addition of shared I/O controllers 140 from chassis 100.

In addition to providing support for KVM capabilities for administering chassis 100, chassis management controller 125 may support various additional functions for sharing the infrastructure resources of chassis 100. In some scenarios, chassis management controller 125 may implement tools for managing the power 135, bandwidth available through network switch 140 and airflow cooling 130 that are available via the chassis 100. As described, the airflow cooling 130 utilized by chassis 100 may include an airflow cooling system that is provided by a rack in which the chassis 100 may be installed and managed by a cooling module of the chassis management controller 125.

In some embodiments, chassis management controller 125 may be a include a microcontroller other logic unit that implements various management operations with respect to integrated and replaceable components of chassis 100, including operations for management of sleds 105a-n, 115a-n installed in the chassis. As described in additional detail below, these logic capabilities of the chassis management controller 100 may operate using factory-provisioned firmware that is validated based on the inventory certificate and used in the operation of an execution environment that tracks the shared hardware components of chassis 100, whether the hardware components are installed in the chassis, or in IHSs (e.g., sleds 105a-n, 115a-n) installed in the chassis.

The chassis management controller 125 may also include a storage module 125c that provides capabilities for managing and configuring certain aspects of the storage devices of chassis 100, such as the storage devices provided within storage sleds 115a-n and within the JBOD 155. In some embodiments, a chassis management controller 125 may be uniquely identified based on a code or other identifier that may be permanently encoded in a non-volatile memory of the chassis management controller 125 by its manufacturer. As described below, embodiments support validation of chassis management controller 125 as being the same chassis management controller that was installed at the factory during the manufacture of chassis 100.

In addition to providing support for KVM 125a capabilities for administering chassis 100, chassis management controller 125 may support various additional functions for sharing the infrastructure resources of chassis 100. In some scenarios, chassis management controller 125 may implement tools for managing the shared power 135, network bandwidth 140 and airflow cooling 130 that are available via the chassis 100. As described, the airflow cooling 130 utilized by chassis 100 may include a shared airflow cooling system that is provided by a rack in which the chassis 100 may be installed and managed by a cooling module 125b of the chassis management controller 125.

As described in additional detail below, in embodiments, chassis management controller 125 may be configured to support validation of the movement of hardware components of chassis 100 that are shared, such as the described shared power 135, data storage 150, 155, network bandwidth 140, I/O controllers 145 and airflow cooling 130 hardware. In embodiments, the chassis management controller 125 may be configured to monitor for notification of successful validation of the authenticity of hardware components detected by IHSs (e.g., compute sleds 105a-n and storage sleds 115a-n) that are installed in the chassis 100. Based on such notifications, chassis management controller 125 may maintain a listing of the hardware components of chassis 100 that are being shared by the IHSs that are currently operating in the chassis. In response to notifications from an IHS installed in the chassis 100 of a failure to validate the detected hardware of the IHS based on its inventory certificate and any delta certificates that have been issued, the chassis management controller 125 determines whether the reported validation failure is due to movement of a shared hardware component of chassis 100.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 shows an example of an IHS 200 configured to implement systems and methods described herein for supporting the validation of the movement of shared chassis hardware components that are utilized by the IHS 200. It should be appreciated that although the embodiments described herein may describe an IHS that is a compute sled or similar computing component that may be deployed within the bays of a chassis, other embodiments may be utilized with other types of IHSs that may also support validation of the secure assembly and delivery of the IHS 200, and further support validation of the movement of shared chassis hardware components that are utilized by the IHS 200. In the illustrative embodiment of FIG. 2, IHS 200 may be a computing component, such as compute sled 105a-n or other type of server, such as an 1RU server installed within a 2RU chassis, that is configured to share infrastructure resources provided by a chassis 100.

As described, an IHS 200 may be assembled and provisioned according to customized specifications provided by a customer. The IHS 200 of FIG. 2 may be a compute sled, such as compute sleds 105a-n of FIG. 1, that may be installed within a chassis, that may in turn be installed within a rack. Installed in this manner, IHS 200 may utilize shared resources, such as power 135, network 140 and cooling 130 resources, provided by the chassis 100. Embodiments of IHS 200 may include a wide variety of different hardware configurations. Such variations in hardware configuration may result from IHS 200 being factory assembled to include components specified by a customer that has contracted for manufacture and delivery of IHS 200. As described in additional detail below, IHS 200 may include capabilities that allow a customer to validate that the hardware components of IHS 200 are the same hardware components that were installed at the factory during its manufacture, and further include capabilities that allow the customer to validate the movement, addition or removal of shared chassis hardware components that are utilized by the IHS.

As described in additional detail below, IHS 200 may include capabilities that allow a customer to validate that is hardware detected as installed IHS 200 is the same factory installed and provisioned hardware that was supplied to the customer. In addition, embodiments support secure modifications to IHS 200 and to the chassis 100 in which IHS 200 is installed. For instance, modifications made by administrator may include adding, removing or replacing hardware components of chassis 100 that are shared by IHS 200 and by other IHSs configured according to embodiments and installed in this same chassis. For example, an administrator may replace a swappable power supply unit 135 of the chassis 100 in which an IHS 200 is installed, such as in order to support routine maintenance of the power supply unit 135, or such as to replace a failing power supply unit 135. Accordingly, in some instances, the power supply unit 135 that is removed will be permanently removed and in other instances the removed power supply unit 135 will be in-installed once it has been serviced. In all such instances, such administration of shared chassis hardware components may result in a validation failure by IHS 200, where such validation failure results discrepancies between the hardware detected by IHS 200 and the factory-installed hardware specified in the factory-provisioned inventory certificate of the IHS 200. In such scenarios, embodiments support the validation of the movement of shared chassis hardware components that are detected by the IHS 200.

IHS 200 may utilize one or more processors 205. In some embodiments, processors 205 may include a main processor and a co-processor, each of which may include a plurality of processing cores that, in certain scenarios, may each be used to run an instance of a server process. In certain embodiments, one or all of processor(s) 205 may be graphics processing units (GPUs) in scenarios where IHS 200 has been configured to support functions such as multimedia services and graphics applications. In some embodiments, each of the processors 205 may be uniquely identified based on a code or other identifier that may be permanently encoded in a respective processor 205 by its manufacturer. As described below, embodiments support validation of processors 205 as being the same processors that were installed at the factory during the manufacture of IHS 200.

As illustrated, processor(s) 205 includes an integrated memory controller 205a that may be implemented directly within the circuitry of the processor 205, or the memory controller 205a may be a separate integrated circuit that is located on the same die as the processor 205. The memory controller 205a may be configured to manage the transfer of data to and from the system memory 210 of the IHS 205 via a high-speed memory interface 205b. The system memory 210 is coupled to processor(s) 205 via a memory bus 205b that provides the processor(s) 205 with high-speed memory used in the execution of computer program instructions by the processor(s) 205. Accordingly, system memory 210 may include memory components, such as static RAM (SRAM), dynamic RAM (DRAM), NAND Flash memory, suitable for supporting high-speed memory operations by the processor(s) 205. In certain embodiments, system memory 210 may combine both persistent, non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory. In some embodiments, each of the memory modules 210a-n may be uniquely identified based on a code or other identifier that may be permanently encoded in a respective memory module 210a-n by its manufacturer. As described below, embodiments support validation of memory modules 210a-n as being the same memory modules that were installed at the factory during the manufacture of IHS 200. As described in additional detail below, embodiments may further support secure validation of the replacement, removal or addition of memory modules 210a-n.

IHS 200 may utilize a chipset that may be implemented by integrated circuits that are connected to each processor 205. All or portions of the chipset may be implemented directly within the integrated circuitry of an individual processor 205. The chipset may provide the processor(s) 205 with access to a variety of resources accessible via one or more in-band buses 215. Various embodiments may utilize any number of buses to provide the illustrated pathways served by in-band bus 215. In certain embodiments, in-band bus 215 may include a PCIe (PCI Express) switch fabric that is accessed via a PCIe root complex. IHS 200 may also include one or more I/O ports 250, such as PCIe ports, that may be used to couple the IHS 200 directly to other IHSs, storage resources and/or other peripheral components.

As illustrated, IHS 200 may include one or more FPGA (Field-Programmable Gate Array) cards 220. Each of the FPGA card 220 supported by IHS 200 may include various processing and memory resources, in addition to an FPGA logic unit that may include circuits that can be reconfigured after deployment of IHS 200 through programming functions supported by the FPGA card 220. Through such reprogramming of such logic units, each individual FGPA card 220 may be optimized to perform specific processing tasks, such as specific signal processing, security, data mining, and artificial intelligence functions, and/or to support specific hardware coupled to IHS 200. In some embodiments, a single FPGA card 220 may include multiple FPGA logic units, each of which may be separately programmed to implement different computing operations, such as in computing different operations that are being offloaded from processor 205. The FPGA card 220 may also include a management controller 220a that may support interoperation with the remote access controller 255 via a sideband device management bus 275a. In some embodiments, each of the FPGA cards 220 installed in IHS 200 may be uniquely identified based on a code or other identifier that may be permanently encoded in the FPGA card 220 by its manufacturer. As described below, embodiments support validation of FPGA card 220 as being the same FPGA card that was installed at the factory during the manufacture of IHS 200.

Processor(s) 205 may also be coupled to a network controller 225 via in-band bus 215, such as provided by a Network Interface Controller (NIC) that allows the IHS 200 to communicate via an external network, such as the Internet or a LAN. In some embodiments, network controller 225 may be a replaceable expansion card or adapter that is coupled to a motherboard connector of IHS 200. In some embodiments, network controller 225 may be an integrated component of IHS 200. In some embodiments, network controller 225 may be uniquely identified based on a code or other identifier, such as a MAC address, that may be permanently encoded in a non-volatile memory of network controller 225 by its manufacturer. As described below, embodiments support validation of network controller 225 as being the same network controller that was installed at the factory during the manufacture of IHS 200.

IHS 200 may include one or more storage controllers 230 that may be utilized to access storage drives 240a-n that are accessible via the chassis in which IHS 100 is installed. Storage controller 230 may provide support for RAID (Redundant Array of Independent Disks) configurations of logical and physical storage drives 240a-n. In some embodiments, storage controller 230 may be an HBA (Host Bus Adapter) that provide more limited capabilities in accessing physical storage drives 240a-n. In some embodiments, storage drives 240a-n may be replaceable, hot-swappable storage devices that are installed within bays provided by the chassis in which IHS 200 is installed. In embodiments where storage drives 240a-n are hot-swappable devices that are received by bays of chassis, the storage drives 240a-n may be coupled to IHS 200 via couplings between the bays of the chassis and a midplane of IHS 200. In some embodiments storage drives 240a-n may also be accessed by other IHSs that are also installed within the same chassis as IHS 100. Storage drives 240a-n may include SAS (Serial Attached SCSI) magnetic disk drives, SATA (Serial Advanced Technology Attachment) magnetic disk drives, solid-state drives (SSDs) and other types of storage drives in various combinations.

In some embodiments, each individual storage controller 230 and storage drive 240a-n may be uniquely identified based on a code or other identifier that may be permanently encoded in a non-volatile memory of the component by its manufacturer. As described below. Embodiments support validation of storage controller 230 and storage drives 240a-n as being the same storage controller and storage drives that were installed at the factory during the manufacture of IHS 200. In some embodiments, some or all of storage drives 240a-n may be designated during factory provisioning of IHS 200 as replaceable hardware components of the IHS.

A variety of additional components may be coupled to processor(s) 205 via in-band bus 215. For instance, processor(s) 205 may also be coupled to a power management unit 260 that may interface with the power system unit 135 of the chassis 100 in which an IHS, such as a compute sled, may be installed. In certain embodiments, a graphics processor 235 may be comprised within one or more video or graphics cards, or an embedded controller, installed as components of the IHS 200. In certain embodiments, graphics processor 235 may be an integrated component of the remote access controller 255 and may be utilized to support the display of diagnostic and administrative interfaces related to IHS 200 via display devices that are coupled, either directly or remotely, to remote access controller 255. In some embodiments, components such as power management unit 260 and graphics processor 235 may also be uniquely identified based on a code or other identifier that may be permanently encoded in a non-volatile memory of these components by their respective manufacturer. As described below, embodiments support validation of these components as being components that were installed at the factory during the manufacture of IHS 200.

In certain embodiments, IHS 200 may operate using a BIOS (Basic Input/Output System) that may be stored in a non-volatile memory accessible by the processor(s) 205. The BIOS may provide an abstraction layer by which the operating system of the IHS 200 interfaces with the hardware components of the IHS. Upon powering or restarting IHS 200, processor(s) 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for use by the IHS 200. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 255. As described in additional detail below, in some embodiments, BIOS may be configured to identify hardware components that are detected as being currently installed in IHS 200. In such instances, the BIOS may support queries that provide the described unique identifiers that have been associated with each of these detected hardware components by their respective manufacturers.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As described, IHS 200 may include a remote access controller 255 that supports remote management of IHS 200 and of various internal components of IHS 200. In certain embodiments, remote access controller 255 may operate from a different power plane from the processors 205 and other components of IHS 200, thus allowing the remote access controller 255 to operate, and management tasks to proceed, while the processing cores of IHS 200 are powered off.

For instance, during such intervals where the processing cores of IHS 200 are powered off, remote access controller 255 may interface with the chassis management controller 125 of the chassis 100 in which IHS 200 is installed. For instance, remote access controller 255 may utilize out-of-band signaling pathways supported by chassis 100, such as via signaling pathways of a coupling supported by the connector used to attach IHS 200 to chassis 100, where out-of-band signaling may be implemented though connections separate from those supported by the backplane 160 of chassis 100, as illustrated in FIG. 1. As described in additional detail below, in embodiments, chassis management controller 125 interfaces with remote access controller 255 in validating the movement of shared hardware components of chassis 100 that are shared by IHS 200.

As described, various functions provided by the BIOS, including launching the operating system of the IHS 200, may be implemented by the remote access controller 255. In some embodiments, the remote access controller 255 may perform various functions to verify the integrity of the IHS 200 and its hardware components prior to initialization of the operating system of IHS 200 (i.e., in a bare-metal state). In some embodiments, certain operations of the remote access controller 225, such as the described inventory certificate generation and validation operations, may operate using validated instructions, and thus within the root of trust of IHS 200.

In some embodiments, remote access controller 255 may be uniquely identified based on a code or other identifier that may be permanently encoded in a non-volatile memory of the remote access controller 255 by its manufacturer. As described below, embodiments support validation of remote access controller 255 as being the same controller that was installed at the factory during the manufacture of IHS 200. Also as described below, during a provisioning phase of the factory assembly of IHS 200, a signed certificate that specifies factory installed hardware components of IHS 200 that were installed during manufacture of the IHS 200 may be stored in a non-volatile memory that is accessed by remote access controller 255. Using this signed inventory certificate stored by the remote access controller 255, a customer may validate that the detected hardware components of IHS 200 are the same hardware components that were installed at the factory during manufacture of IHS 200. As described in additional detail below, embodiments may further support secure validation of the replacement, removal or addition of hardware components of IHS 200 that are managed by remote access controller 255, or that are detected as hardware that is available for use by IHS 200, such as shared hardware components 135, 145, 140, 150, 155, 130 of the chassis 100 in which the IHS 200 is installed.

In support of the capabilities for validating the detected hardware components of IHS 200 against the inventory information that is specified in a signed inventory certificate, remote access controller 255 may support various cryptographic capabilities. For instance, remote access controller 255 may include capabilities for key generation such that remote access controller may generate keypairs that include a public key and a corresponding private key. As described in additional detail below, using generated keypairs, remote access controller 255 may digitally sign inventory information collected during the factory assembly of IHS 200 such that the integrity of this signed inventory information may be validated at a later time using the public key by a customer that has purchased IHS 200. Using these cryptographic capabilities of the remote access controller, the factory installed inventory information that is included in an inventory certificate may be anchored to a specific remote access controller 255, since the keypair used to sign the inventory information is signed using the private key that is generated and maintained by the remote access controller 255.

In some embodiment, the cryptographic capabilities of remote access controller 255 may also include safeguards for encrypting any private keys that are generated by the remote access controller and further anchoring them to components within the root of trust of IHS 200. For instance, a remote access controller 255 may include capabilities for accessing hardware root key (HRK) capabilities of IHS 200, such as for encrypting the private key of the keypair generated by the remote access controller. In some embodiments, the HRK may include a root key that is programmed into a fuse bank, or other immutable memory such as one-time programmable registers, during factory provisioning of IHS 200. The root key may be provided by a factory certificate authority, such as described below. By encrypting a private key using the hardware root key of IHS 200, the hardware inventory information that is signed using this private key is further anchored to the root of trust of IHS 200. If a root of trust cannot be established through validation of the remote access controller cryptographic functions that are used to access the hardware root key, the private key used to sign inventory information cannot be retrieved. In some embodiments, the private key that is encrypted by the remote access controller using the HRK may be stored to a replay protected memory block (RPMB) that is accessed using security protocols that require all commands accessing the RPMB to be digitally signed using a symmetric key and that include a nonce or other such value that prevents use of commands in replay attacks. Stored to an RPMG, the encrypted private key can only be retrieved by a component within the root of trust of IHS 200, such as the remote access controller 255.

Remote access controller 255 may include a service processor 255a, or specialized microcontroller, that operates management software that supports remote monitoring and administration of IHS 200. Remote access controller 255 may be installed on the motherboard of IHS 200 or may be coupled to IHS 200 via an expansion slot provided by the motherboard. In support of remote monitoring functions, network adapter 225*c* may support connections with remote access controller 255 using wired and/or wireless network connections via a variety of network technologies.

In some embodiments, remote access controller 255 may support monitoring and administration of various managed devices 220, 225, 230, 280 of an IHS via a sideband bus interface. For instance, messages utilized in device management may be transmitted using I2C sideband bus connections 275*a-d* that may be individually established with each of the respective managed devices 220, 225, 230, 280 through the operation of an I2C multiplexer 255*d* of the remote access controller. As illustrated, certain of the managed devices of IHS 200, such as non-standard hardware 220, network controller 225 and storage controller 230, are coupled to the IHS processor(s) 205 via an in-line bus 215, such as a PCIe root complex, that is separate from the I2C sideband bus connections 275*a-d* used for device management. The management functions of the remote access controller 255 may utilize information collected by various managed sensors 280 located within the IHS. For instance, temperature data collected by sensors 280 may be utilized by the remote access controller 255 in support of closed-loop airflow cooling of the IHS 200.

In certain embodiments, the service processor 255*a* of remote access controller 255 may rely on an I2C co-processor 255*b* to implement sideband I2C communications between the remote access controller 255 and managed components 220, 225, 230, 280 of the IHS. The I2C co-processor 255*b* may be a specialized co-processor or micro-controller that is configured to interface via a sideband 12C bus interface with the managed hardware components 220, 225, 230, 280 of IHS. In some embodiments, the I2C co-processor 255*b* may be an integrated component of the service processor 255*a*, such as a peripheral system-on-chip feature that may be provided by the service processor 255*a*. Each I2C bus 275*a-d* is illustrated as single line in FIG. 2. However, each I2C bus 275*a-d* may be comprised of a clock line and data line that couple the remote access controller 255 to 12C endpoints 220*a*, 225*a*, 230*a*, 280*a* which may be referred to as modular field replaceable units (FRUs).

As illustrated, the I2C co-processor 255*b* may interface with the individual managed devices 220, 225, 230, 280 via individual sideband 12C buses 275*a-d* selected through the operation of an I2C multiplexer 255*d*. Via switching operations by the 12C multiplexer 255*d*, a sideband bus connection 275*a-d* may be established by a direct coupling between the I2C co-processor 255*b* and an individual managed device 220, 225, 230, 280. In providing sideband management capabilities, the I2C co-processor 255*b* may each interoperate with corresponding endpoint I2C controllers 220*a*, 225*a*, 230*a*, 280*a* that implement the I2C communications of the respective managed devices 220, 225, 230. The endpoint I2C controllers 220*a*, 225*a*, 230*a*, 280*a* may be implemented as a dedicated microcontroller for communicating sideband I2C messages with the remote access controller 255, or endpoint I2C controllers 220*a*, 225*a*, 230*a*, 280*a* may be integrated SoC functions of a processor of the respective managed device endpoints 220, 225, 230, 280.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
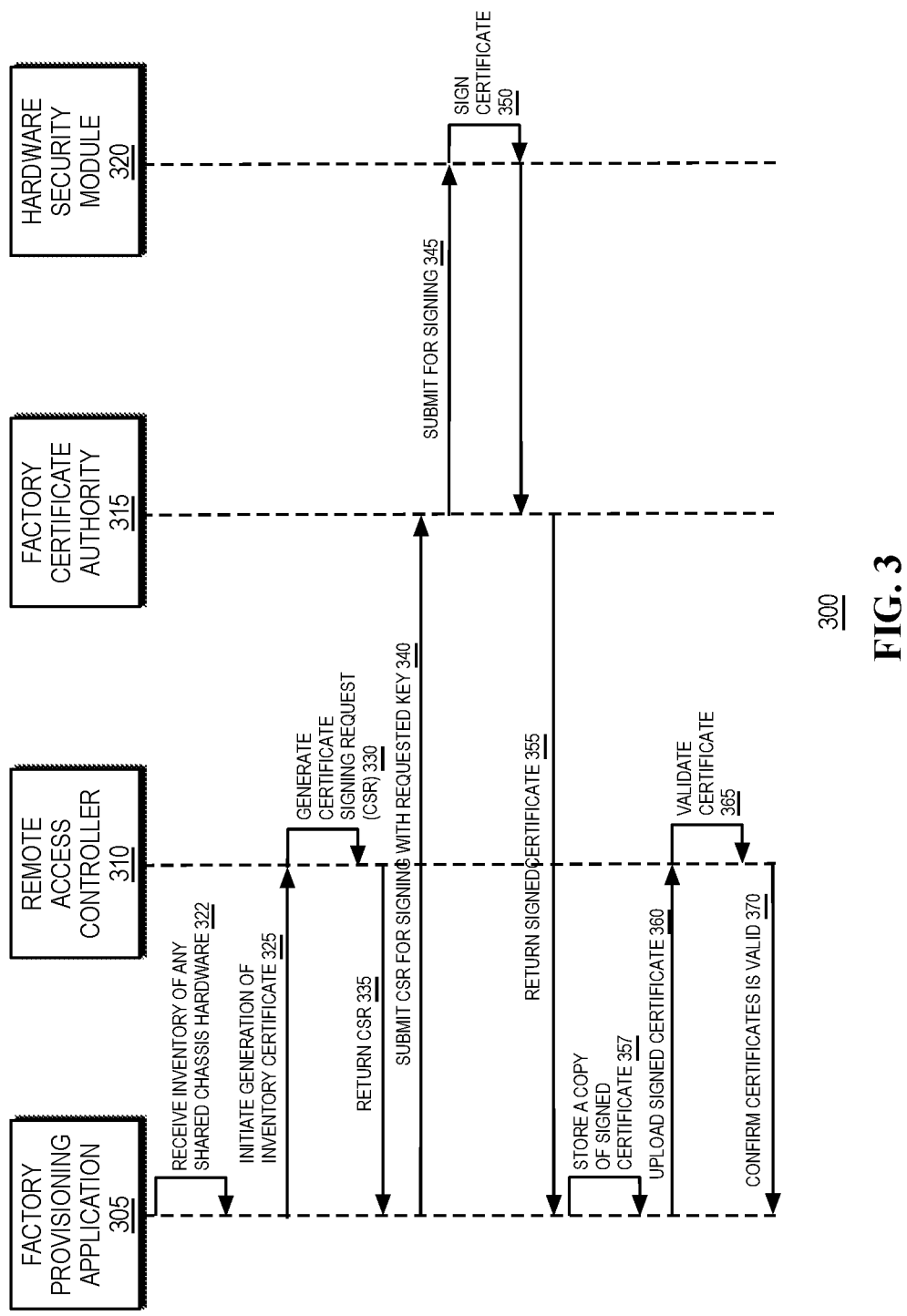
FIG. 3 is a swim lane diagram illustrating certain responsibilities of components of a system configured according to certain embodiments for factory provisioning of an IHS in a manner that supports the validation of the movement of shared chassis hardware components that are utilized by the IHS.
Figure 4:
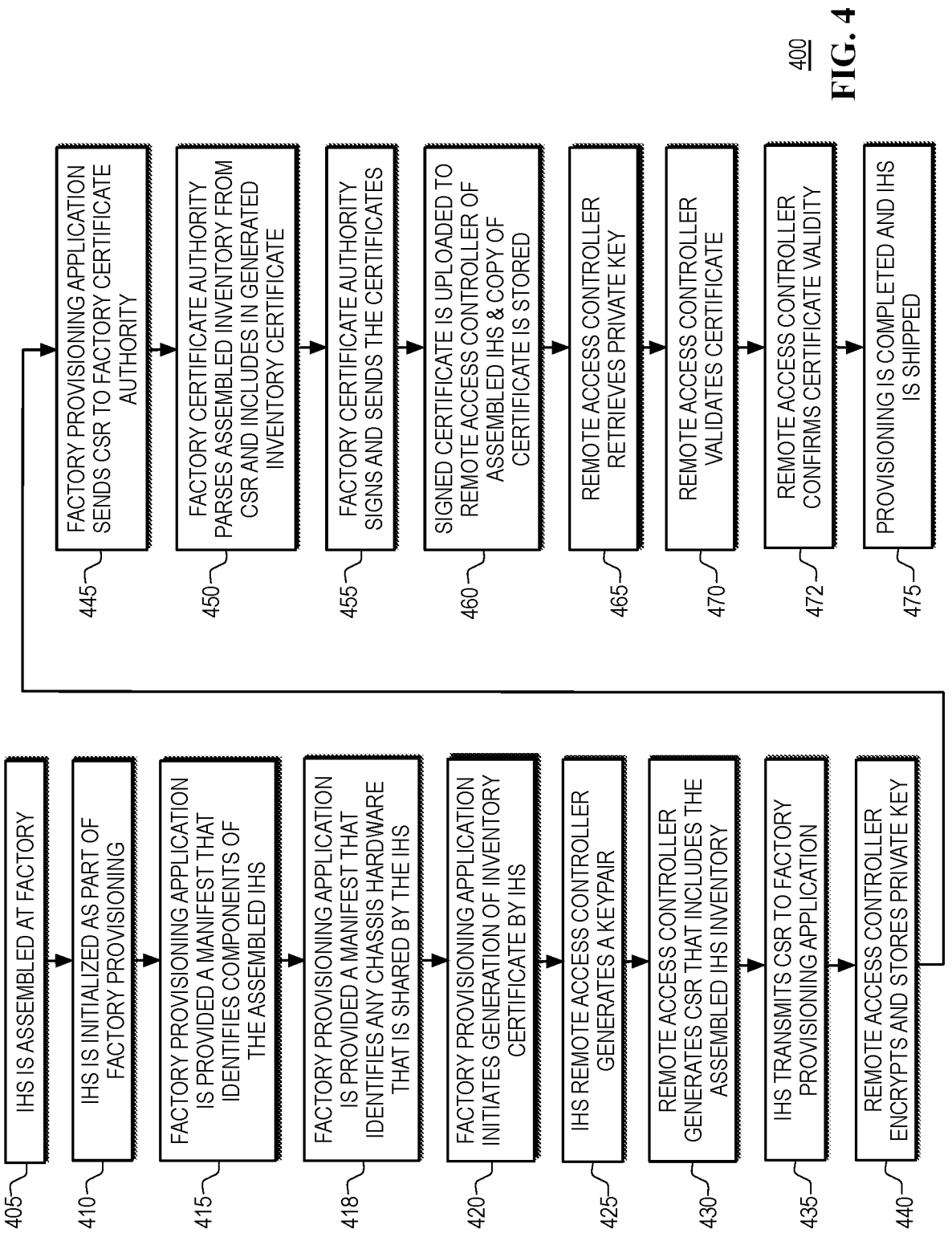
FIG. 4 is a flowchart describing certain steps of a method, according to some embodiments, for assembly and provisioning of an IHS in a manner that supports the validation of the movement of shared chassis hardware components that are utilized by the IHS.

FIG. 3 is a swim lane diagram illustrating certain responsibilities of components of a system configured according to certain embodiments for factory provisioning of an IHS in a manner that supports validation of the movement of shared chassis hardware components that are utilized by the IHSIHS. FIGS. 4A-B are a flowchart describing certain steps of a method, according to some embodiments, for factory provisioning of an IHS in a manner that supports validation of the movement of shared chassis hardware components that are utilized by the IHS. Some embodiments of the method of FIGS. 4A-B may begin, at block 405, with the factory assembly of an IHS, such as the assembly of a server described with regard to FIGS. 1 and 2. In some instances, an IHS may be manufactured using a factory process that includes multiple phases of assembly, validation and provisioning that must be completed before the IHS is supplied to a customer. As described, an IHS such as a server may be purpose-built for a particular customer such that the server is assembled and provisioned according to specifications provided by the customer. The initial factory assembly of such server IHSs may include the selection of a chassis and the fastening of various hardware components to the selected chassis. Such a factory assembly process may include generating a manifest that tracks the individual hardware components that are installed in an IHS or chassis. As described above, the installed hardware components may include standard components and may also include specialized components that have been requested by a specific customer that has contracted for the assembly and delivery of an IHS that is installed in a chassis.

Once the assembly of an IHS has been completed and installed in a chassis, the IHS may be subjected to manual and automated inspections that confirm the IHS has been properly assembled and does not include any defects. After confirming an IHS has been assembled without any manufacturing defects, at block 410, factory provisioning of the IHS may be initiated. In some instances, the provisioning of an IHS at the factory may include various stages that may include stages for loading of firmware, configuring hardware components, and installing an operating system and other software. As indicated in FIG. 3, various aspects of this factory provisioning process may be conducted using a factory provisioning application 305, where this factory provisioning application may run on one or more servers and may interface with an IHS that is being provisioned once a requisite amount of firmware and software has been installed to the IHS.

As described, a manifest of the individual hardware components that are installed in an IHS may be generated during assembly of the IHS. Such a manifest may be a file that includes an entry for each component installed to an IHS, where the entry may specify various characteristics of the component, such as model numbers and installation locations, and may also specify any unique identifiers associated with the component, such as a MAC address or a serial number. At block 415, a manifest generated during assembly of an IHS is provided to the factory provisioning application 305 that is being used to provision the assembled IHS.

As indicated in FIG. 3, at 322 and at 418, the factory provisioning application 305 also receives a manifest of any hardware components of chassis 100 that are accessible by the IHS being provisioned, where these chassis 100 hardware components are thus shared by multiple IHSs installed in the chassis. In some embodiments, this manifest of shared chassis hardware may be generated during the installation of IHS in a shared chassis 100, in a similar manner to the manifest that identifies each of the factory-installed hardware components of the IHS. In some instances, this manifest may be generated by interrogating the shared hardware components of chassis 100, such as by retrieving data encoded in a memory, register or other location of the hardware component, where this data is made available by the hardware component in support of identifying the component and providing characteristics of the component for use in its management. In some instances, the manifest of shared hardware components of chassis 100 that are accessible by the IHS being provisioned may be generated in full or in part by the chassis management controller of the chassis 100 in which the IHS is installed. In some embodiments, the chassis management controller may interface with each of the remote access controllers of IHSs installed in the chassis in generating the manifest of shared chassis hardware, such as to confirm the shared chassis hardware is detectable by an IHS installed in the chassis.

Based on this manifest of IHS hardware and shared chassis hardware information, at block 420, the factory provisioning application 305 may also initiate the generation of an inventory certificate that may be used to validate that the detected hardware components of the IHS are the same hardware components that were installed during the factory assembly of the IHS, and for supporting the validation of the movement of shared chassis hardware components that are utilized by the IHS. In embodiments, the validation of the IHS hardware as factory installed using the inventory certification may be extended through the use of a delta certificates that are generated based on administrators making modifications to the factory installed hardware, where authorization to generate such delta certificates may be triggered by a chassis management controller confirming that a reported validation discrepancy has resulted from movement of a shared chassis hardware component.

As described with regard to FIGS. 1 and 2, an IHS may include a remote access controller that provides capabilities for remote management of an IHS, where these remote management capabilities may include sideband management of various hardware components of an IHS, and sideband communications with a chassis management controller of the chassis in which the IHS is installed. As indicated in FIG. 3, the generation of an inventory certificate for a newly assembled IHS, at 325, may be initiated via a request from the factory provisioning application 305 to the remote access controller 310 of the IHS. As described with regard to FIG. 2, a remote access controller of an IHS may include cryptographic capabilities that operate within the root of trust of the IHS and that include the ability to generate cryptographic keypairs. Utilizing such cryptographic capabilities, at block 425, the remote access controller 310 initiates the generation of an inventory certificate by generating a cryptographic key pair for use in validating the authenticity of inventory information that is included in an inventory certificate.

At block 430 and at 330, the remote access controller 310 generates a certificate signing request (CSR) for a digital identity certificate, where the request specifies the public key of the key pair generated by the remote access controller and also specifies the factory installed hardware inventory from the manifest that was generated during assembly of the IHS, and also specifies the inventory of shared chassis hardware that is accessible by the IHS. The factory installed hardware and shared hardware inventory information included in the CSR may be signed by the remote access controller using the private key from the generated keypair. At block 435 and at 335, the CSR for the requested inventory certificate is transmitted to the factory provisioning application 305 by the remote access controller 310. At block 440, the remote access controller safeguards the private key from the generated key pair. In some embodiments, the remote access controller may encrypt the private key using the hardware root key (HRK) of the IHS and may store the encrypted key to a protected memory, such as the replay protected memory block that is described with regard to FIG. 2.

Upon receiving the certificate signing request from the remote access controller 310, at block 445 and at 340, the factory provisioning application 305 submits the CSR for signing by a factory certificate authority 315. In some embodiments, the factory provisioning application 305 specifies a factory key to be used by the factory certificate authority 315 in signing the inventory certificate. For instance, the factory provisioning application may include the name of a trusted certificate associated with a factory key as an attribute of the CSR that is transmitted to the factory certificate authority 315. Upon receipt of the CSR, at block 450, the factory certificate authority parses from the CSR: the hardware inventory information, the shared chassis hardware inventory information, the public key generated by the remote access controller and the information specifying the requested signing key. Based on the information parsed from the CSR, the factory certificate authority generates a digital identity certificate, referred to herein as an inventory certificate, that is associated with the public key provided by the remote access controller and that specifies the factory installed hardware inventory of the IHS, and also specifies shared chassis hardware accessible by the IHS.

As indicated in FIG. 3, at 345, the factory certificate authority 315 submits the generated inventory certificate for signing by a hardware security module 320 that may be a dedicated hardware component of a factory provisioning server that safeguards cryptographic keys and implements cryptographic functions utilized in the factory provisioning process. In some embodiments, the factory certificate authority 315 may also specify a certificate name associated with a signing key that is maintained by the hardware security module 320. At 350, the hardware security module 320 utilizes the private key associated with the specified certificate in order to digitally sign the submitted inventory certificate, which includes the inventory of the factory installed hardware components of the IHS and the inventory of shared chassis hardware accessible by the IHS. The signed inventory certificate is then returned to the factory certificate authority 315 by the hardware security module 320.

Once the inventory certificate has been signed, at block 460 and at 355, the signed inventory certificate is transmitted from the factory certificate authority 315 to the factory provisioning application 305. As indicated in FIG. 3 at 357, the factory provisioning application 305 may store a copy of the signed inventory certificate. In some instances, the copy may be saved to a data store utilized in providing ongoing support of the IHS once it has been shipped and has been deployed by a customer. Once the IHS is deployed, embodiments may be utilized by designated administrators to augment this factory-provisioned inventory certificate with one or more delta certificates that each specify modifications to the hardware of the IHS, such as adding, removing or replacing a hardware components of the IHS. In embodiments, such delta certificates may be generated in response to a determining that a detected hardware modification is due to the movement, addition or removal of shared chassis hardware.

At block 465 and at 360, the signed inventory certificate is than loaded to the assembled IHS. As indicated in FIG. 3, in some embodiments, the signed inventory certificate may be uploaded to a remote access controller 310 of the assembled IHS, such that the signed inventory certificate may be stored to a nonvolatile memory or other persistent storage that is accessible by the remote access controller 310 independent from the operating system of the IHS. In other embodiments, the signed inventory certificate may be uploaded without reliance on the remote access controller to another non-volatile memory of the IHS.

Some embodiments may continue, at 365, with the validation of the signed inventory certificate by the remote access controller 310. Using the private key from the generated keypair, at block 470, the remote access controller decrypts the signature included by the remote access controller in the CSR and confirms that the inventory information included in the signed inventory certificate matches the inventory information that was submitted in the certificate signing request, thus validating the integrity of the generation of the signed inventory certificate. At block 472, the remote access controller confirms that the inventory included in the signed inventory certificate is valid and, at 370, the remote access controller 310 confirms the validity of the inventory certificate with a notification to the factory provisioning application 305. With the generation and validation of the signed inventory certificate completed, additional factory provisioning of the assembled IHS may be completed and, at block 490, the assembled IHS may be shipped from the factory to an individual or location designated by a customer.

Figure 5:
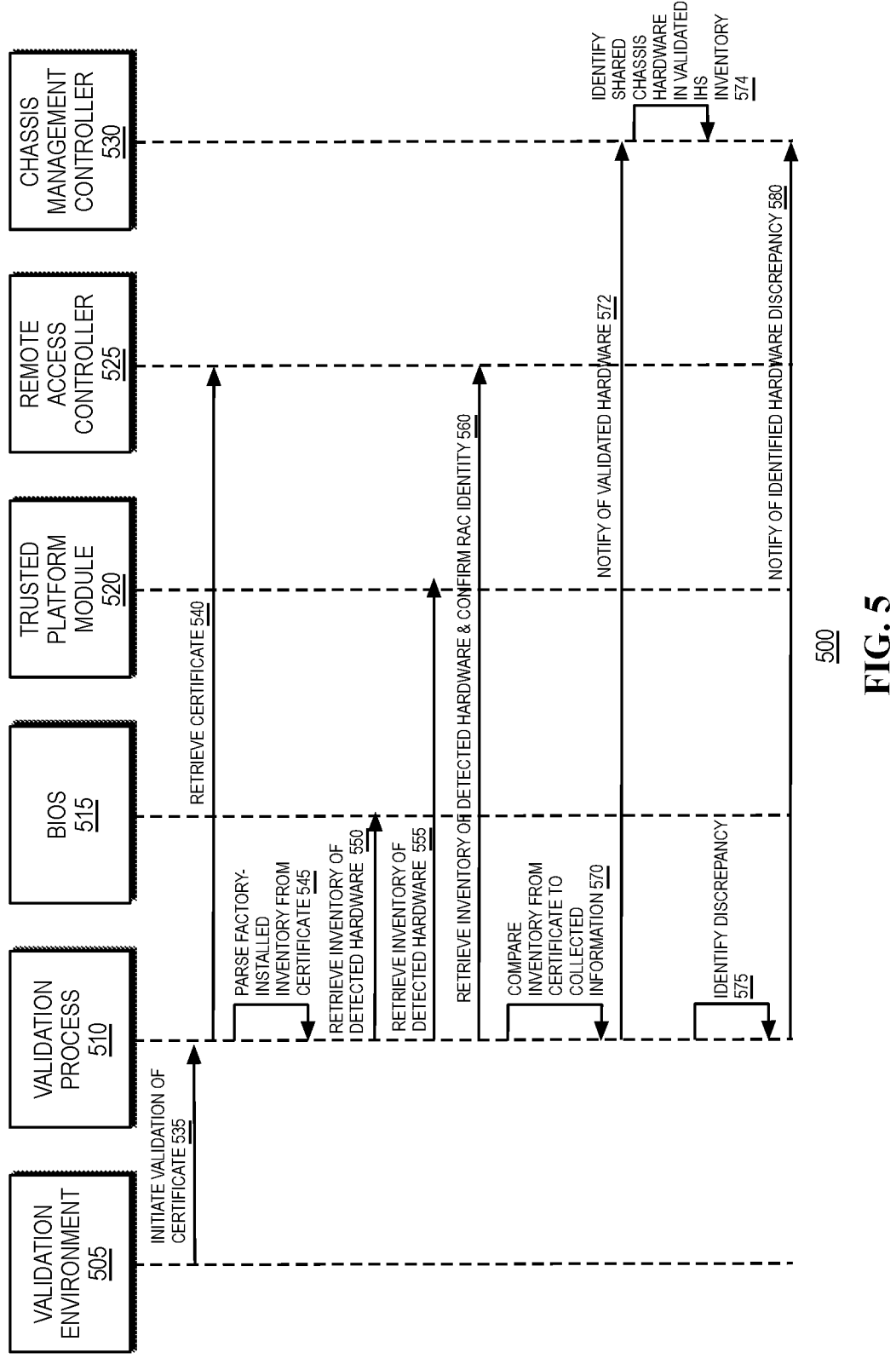
FIG. 5 is a swim lane diagram illustrating certain responsibilities of components of an system configured according to certain embodiments for validating the movement of shared chassis hardware components that are utilized by an IHS.
Figure 6B:
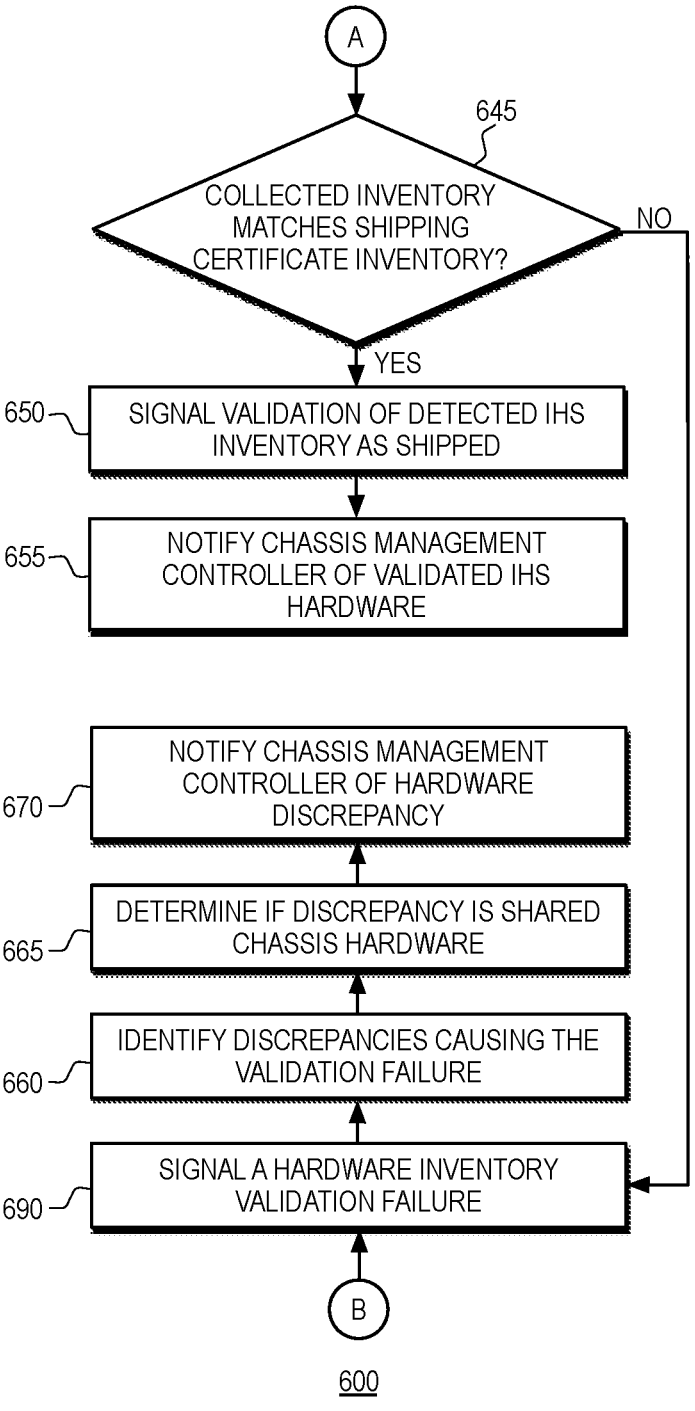
FIG. 6B is a continuation of the flowchart of FIG. 6A.

FIG. 5 is a swim lane diagram illustrating certain responsibilities of components of an IHS configured according to certain embodiments for use of an inventory certificate in the validation of the hardware components of the IHS, including the validation of discrepancies resulting from movement of shared chassis hardware. FIGS. 6A and 6B are a flowchart describing certain steps of a method, according to some embodiments, for use of an inventory certificate in the validation of the hardware components of the IHS, including the validation of discrepancies resulting from movement, addition or removal of shared chassis hardware. Embodiments may begin with the delivery of an IHS to a location specified by a customer, where the IHS has been assembled and provisioned according to the procedures set forth above. In particular, the delivered IHS has been provisioned at the factory to include a signed inventory certificate that specifies the factory installed hardware components of the IHS, and that specifies the shared chassis hardware that is accessible by the IHS.

Upon receiving an IHS configured in this manner, the IHS may be unpacked, assembled and initialized by an administrator 502. In some instances, an IHS may be ready for immediate deployment by a customer. In other instances, an IHS may require further provisioning by customer before it is deployed, such as for operation within a particular data center. As such, in various instances, an IHS may be unpacked, assembled and initialized in order to deploy the IHS or to prepare it for further provisioning.

At block 605, the IHS has been powered and validation process is initialized. In some instances, the validation process may be initialized as part of the initial provisioning of an IHS by a customer. In other instances, the validation process may be initialized by an administrator as part of an onboarding procedure for configuring modifications to the hardware of the IHS. In some embodiments, the validation process may run within a pre-boot environment, such as a PXE (Preboot execution Environment) operating environment. In some embodiments, a PXE operating environment in which a validation process runs may be retrieved from a network location and may thus be executed using the processing and memory capabilities of the IHS. In some embodiments, a PXE operating environment may be retrieved using secure protocols, such as HTTPS, in order to assure the integrity of the operating environment instructions that are utilized. In some embodiments, a pre-boot operating environment in which the validation process runs may include an operating environment that is executed by the remote access controller of the IHS based on validated firmware instructions. In these embodiments that utilize a pre-boot operating environment, the validation of the detected hardware components of the IHS is conducted prior to booting of the operating system of the IHS.

In some embodiments, the validation process may run as part of a diagnostic mode that is supported by an IHS. For instance, an IHS may support a diagnostic mode that may be initiated by a user or may be initiated automatically in response to detecting various conditions, where the diagnostic mode may support various diagnostic tools, including the described hardware validation procedures. In some embodiments, the diagnostic mode may involve re-booting the IHS to a diagnostic environment, while other embodiments may support diagnostic mode operations that run within the operating system of the IHS. Accordingly, some embodiments may support the described hardware validation procedures as a feature available within the operating system of the IHS. In such embodiments, the operating system may be configured to periodically conduct the described hardware validation procedures, such as on a daily or weekly basis. The operating system may likewise be configured to conduct the hardware validation procedures in response to a detected security notification, such as a notification that a process is attempting to access a protected resource. In some embodiments, the described validation procedures may be implemented remotely, such as via the described HTTPS protocols, where the remote validation procedures may rely both on information retrieved from the IHS via HTTPS and on remote information, such as information maintained by the manufacturer of the IHS or by an entity supporting the administration of the IHS.

As indicated at 535 of FIG. 5, an inventory certificate validation process 510 is initiated within a validation environment 505 that may include a pre-boot environment, a diagnostic environment or other environment supporting the validation process. In some embodiments, the inventory certificate validation process 510 operates based on validated instructions, such as based on instructions that, when used to calculate a hash value, are confirmed to correspond to a value stored in an immutable memory of the IHS during its factory provisioning. In this manner, the inventory certificate validation process 510 may be added to the root of trust of the IHS. At block 610 and as indicated at 540, the inventory certificate validation process 510 retrieves the signed inventory certificate from the remote access controller 525, or from a persistent memory of the IHS. As described above, the factory provisioning process may include uploading a signed original inventory certificate to the remote access controller or to a persistent memory of the IHS. At block 615 and at 545, the inventory certificate validation process 510 parses the hardware inventory information from the signed inventory certificate, including the inventory of shared chassis hardware accessible by the IHS. Using the public key provided in the signed inventory certificate, the inventory validation process 510 may confirm the integrity of the inventory information that is included in the signed inventory certificate.

In some scenarios, the inventory certificate validation process 510 may commence by collecting an inventory of the hardware components that are detected by the IHS, where this detected hardware may include shared hardware of the chassis in which the IHS is installed. In some instances, this collection of inventory information may be initiated earlier by the inventory certificate validation process, such as during initialization of the IHS. At block 620 and as indicated at 550, the inventory certificate validation process 510 may query the BIOS 515 of the IHS for an inventory of hardware components that have been detected by BIOS 515. At block 625 and as indicated at 555, the inventory certificate validation process 510 may retrieve additional hardware inventory information from a Trusted Platform Module (TPM) 520 of the IHS. In some instances, the TPM 520 may identify hardware components that are also identified by BIOS 515. However, in some instances, the TPM 520 may identify certain hardware components, such as secure memory modules, that are not identified by BIOS 515.

As described with regard to FIG. 2, a Trusted Platform Module may serve to establish an initial hardware root of trust in an IHS such that the hardware components within this root of trust operate using validated software instructions. Accordingly, in some embodiments, the inventory certificate validation process 510 may compare identity information for the detected TPM 520 against the TPM identity information that is parsed from the inventory certificate at block 545. In some instances, the detection of any discrepancies between the identity of the TPM specified in the inventory certificate and the identity reported by TPM 520 may result in terminating any further validation procedures.

At block 630, the validation process may confirm the identity of the detected TPM against the identity of the TPM reported in the signed inventory certificate. If the identity of the TPM is successfully validated, validation may continue at block 635. However, if the identity of the TPM is not validated, at block 690, the validation process may signal a core inventory validation failure since any discrepancies between the identity of the factory installed TPM and the TPM that has been detected signals a potential compromise in the root of trusted hardware components of the IHS.

At block 635 and as indicated at 560, the inventory certificate validation process 510 may retrieve additional hardware inventory and thermal information from a remote access controller 525 of the IHS. As with TPM 520, remote access controller 525 may provide redundant identification of some hardware components and may provide exclusive identification of other hardware components, such as internal memories, management controllers or logic units utilized by the remote access controller 525.

As with TPM 520, in some embodiments, the inventory certificate validation process 510 may compare identity information for the detected remote access controller 525 against the remote access controller identity information that is parsed from the inventory certificate at block 545. In some instances, the detection of any discrepancies between the identity of the remote access controller specified in inventory certificate and the identity reported by remote access controller 525 may also result in terminating any further validation procedures.

At block 640, the validation process 510 may confirm the identity of the detected remote access controller against the identity of the remote access controller reported in the signed inventory certificate. If the remote access controller is successfully validated, validation may continue at block 645. Otherwise, if the identity of the remote access controller is not validated, at block 690, the inventory certificate validation process may signal a core inventory validation failure. As with the TPM, any discrepancies between the identity of the factory installed remote access controller and the remote access controller detected in the initialized IHS signals a potential compromise of the root of trust of the IHS.

The inventory certificate validation process 510 may retrieve additional inventory from any other available data sources, such as directly from the processor of the IHS or from a chassis management controller of a chassis in which the IHS has been installed. Upon completion of the collection of the detected hardware components of the initialized IHS, at block 570, the inventory certificate validation process compares the collected inventory information of the detected components against the inventory information that is parsed from the signed inventory certificate. If the unique identifiers of the detected hardware components of the initialized IHS match the identifiers of the factory installed hardware components from the signed inventory certificate, at block 650 and 575, the inventory validation process 510 signals a successful validation of the detected hardware of the IHS as being factory-installed hardware, in some instances providing notification of the successful validation to an administrator. The customer receiving delivery of the IHS is thus assured that the IHS is operating using only hardware components that were installed at the factory during manufacture of the IHS, with no missing or additional hardware components detected.

As indicated in FIG. 5, at 572 and at 655, the validation process 510 notifies the chassis management controller 530 of the successful validation of the hardware components that were detected by the IHS. In some embodiments, the validation process 510 may provide the chassis management controller 530 with a listing of the individual hardware components that were detected and validated based on the inventory certificate. In other embodiments, the validation process 510 may only provide the chassis management controller 530 with a confirmation that validation against the inventory certificate was successful. In some instances, the validation process 510 may have knowledge of some of the detected hardware being shared chassis hardware based on an inventory of known shared chassis hardware that may be included in the inventory certificate, as described above. In such instances, validation process 510 may provide the chassis management controller 530 with an identification of certain detected hardware that are being operated by that IHS as shared chassis hardware.

Accordingly, as part of this notification to the chassis management controller 530, the validation process 510 may report detected hardware components that are known to be shared chassis hardware. As described above, the factory-provisioned inventory certificate that is uploaded to an IHS may include an inventory that lists shared chassis hardware that are known to be accessible by that IHS. However, in some instances, the shared chassis hardware that will be accessible to an IHS may be unknown at the time of the factory provisioning of the IHS, such as due to the IHS not yet being installed in any chassis and/or no selection of a chassis for the IHS has yet to be made. Accordingly, inventory of shared chassis hardware in the inventory certificate of an IHS may only specify some, or none, of the shared chassis hardware that is accessible to an IHS once it has been installed in a chassis and deployed. As illustrated in FIG. 5 and as described in additional detail below, at 574, in embodiments, the chassis management controller 530 utilizes the received notifications of successful validations reported by IHSs installed in the chassis to build and maintain an inventory of chassis hardware that is accessible and thus shared by the IHSs.

The system of FIG. 5 may operate in this configuration until an administrator makes a modification to the shared chassis hardware, such as the described scenarios in which shared chassis hardware may be removed, added or replaced. However, once these modifications are made, the validation procedures of FIGS. 5 and 6 will result in a failure to validate the hardware detected by the IHS as factory-installed, according to the inventory set forth in the inventory certificate. Accordingly, at 575, the validation process 510 detects a discrepancy from the hardware specified as authentic in the inventory certificate.

As described in addition detail below, in order to validate these modifications, at 580, the validation process 510 notifies the chassis management controller 530 of the identified discrepancy. Also as described in additional detail below, the chassis management controller 530 is configured to utilize information collected from reports of successful validations by IHSs installed in the chassis to determine whether the reported discrepancy is due to movement of shared chassis hardware. If the discrepancy can be confirmed as due to movement of shared chassis hardware, the chassis management controller 530 may issue a notification that triggers the generation of delta certificates that can be used to confirm the authenticity of these detected modifications to the factory-installed hardware of the IHS.

Figure 7:
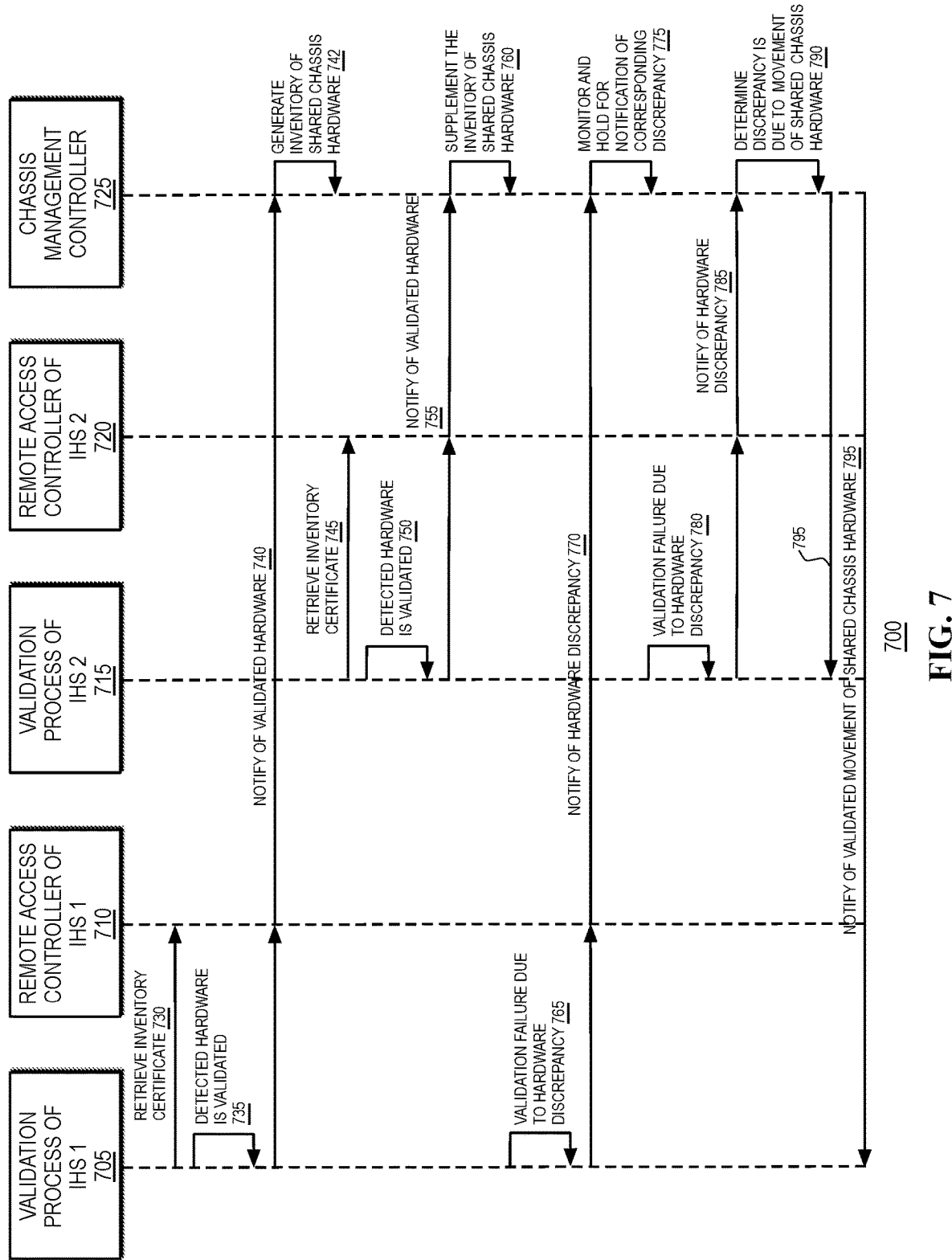
FIG. 7 is a swim lane diagram illustrating certain responsibilities of components of a system configured according to certain embodiments for validating the movement of shared chassis hardware components that are utilized by two IHSs.

FIG. 7 is a swim lane diagram illustrating certain responsibilities of components of a system configured according to certain embodiments for validation of the movement of chassis hardware components that are shared by multiple IHSs installed in the chassis. Embodiments illustrated in FIG. 7 begin with the validation of the hardware components that are detected by an IHS, such as IHS 200 of FIG. 2. Accordingly, embodiments may begin, at 730, with the retrieval of the factory-provisioned inventory certificate by the validation process 510 of the IHS, where the inventory certificate is retrieved from its factory provisioned location by the remote access controller 710 of the IHS. As described above, the retrieval of the factory-provisioned inventory certificate and its use in validating the hardware detected may be initiated in a variety of scenarios, such as upon an administrator rebooting an IHS.

At 735, the retrieved inventory certificate is used in the successful initial validation of the detected hardware of the IHS as factory-installed. As described, this initial validation may occur upon an IHS that is factory-provisioned with an inventory certificate being received at a datacenter or other customer location and initialized for the first time by an administrator that is preparing the IHS for deployment. As described above and as indicated in FIG. 7, at 740, the validation process 510 notifies the chassis management controller 725 of the successful validation of the hardware detected by the IHS, where the detected and validated hardware may include shared chassis hardware.

As described, the successful validation by the validation process 510 may include the identification of some, all, or none of the detected hardware as being shared chassis hardware. In some embodiments, the validation process 510 may obtain a listing of any known factory-installed shared chassis hardware from the factory-provisioned inventory certificate. As described above, in some embodiments, the factory provisioning of an IHS may include generation of an inventory certificate that specifies the factory-installed hardware, and that also specifies any known shared chassis hardware. However, also as described above, shared chassis hardware may be unknown at the time an IHS is factory-provisioned, such as where it is being manufactured and delivered separate from any chassis.

In various embodiments, the notification of a successful hardware validation that is indicated, at 740, may be conducted upon the initial successfully validation of the detected hardware, and may also be repeated upon any other successful validation of the detected hardware as being an authentic hardware configuration. In some instances, the validations that are conducted subsequent to the initial validation of the IHS may be conducted using only the factory-provisioned inventory certificate, or may additionally or alternatively utilize one or more delta certificates in validating modifications to the factory-installed hardware of the IHS.

In certain embodiments, this initial validation of the hardware of the IHS as factory-installed is required in order for the capabilities of the chassis management controller 725 in support of the generation of delta certificates to be enabled with respect to an individual IHS that is installed in the chassis. Once the initial hardware validation of the IHS has been reported, the enabled capabilities of the chassis management controller 725 can then be used to determine whether hardware discrepancies detected by the IHS are a result of the movement of shared chassis hardware. In this manner, the validation of modifications to the hardware shared by the IHS are supported, but only after establishing that the IHS has been received and initialized using only the factory-installed hardware.

With the capabilities of the chassis management controller 725 enabled for validating identified hardware discrepancies of the IHS due to movement of shared chassis hardware, at 742, the chassis management controller 725 begins tracking hardware validations and discrepancies reported by the IHS. More particularly, the chassis management controller 725 generates an inventory of shared chassis hardware. In the scenario illustrated in FIG. 7, at 742, the chassis management controller 725 has received a notification of a validated hardware only from the validation process 705 of a single IHS. According, the chassis management controller 725 may be unable to discern whether any of the detected hardware reported by the validation process 705 of the IHS corresponds to shared chassis hardware, unless that validation process 705 identifies and reports shared chassis hardware specified in its factory-provisioned inventory certificate. In some embodiments, the chassis management controller 530 may have knowledge of some or all of the chassis hardware that is shared, such as a SAS Adapter 150 and/or JBOD storage drives 155 installed in the chassis. In such instances, the chassis management controller 725 may identify certain hardware components reported by the validation process 705 of the IHS as being shared. Based on the notification provided by the validation process 705, the chassis management controller 725 may build and maintain a listing of detected hardware reported by the validation process 705 and may maintain a separate listing used to denote which of these reported hardware components have been determined to be shared chassis hardware.

As indicted in FIG. 7, at 745, embodiments may continue with a validation process 715 of a different IHS is initialized and requests the inventory certificate specifying its factory-installed hardware from the remote access controller 720 of that IHS. As described with regard to FIGS. 5 and 6, using the retrieved inventory certificate, at 750, the validation process 715 of the second IHS identifies any discrepancies between its detected hardware and the hardware specified in its factory-provisioned inventory certificate. In particular, the validation process 715 determines whether any of the factory-installed hardware is detected or whether any hardware other than factory-installed hardware has been detected. As indicated in FIG. 7, if no such discrepancies are detected and the hardware of this IHS is validated as factory installed, at 755, the validation process 715 notifies the chassis management controller 725 of the detected hardware that has been validated.

Using the validated inventory information provided by this second validation process 715, at 760, the chassis management controller 725 supplements its generated listing of shared chassis hardware. In particular, the chassis management controller 725 evaluates the hardware reported as validated by the second validation process 715 against its inventory of known shared chassis hardware and against the inventory of hardware reported as validated by the first validation process 705. If the chassis management controller 725 identifies any of the validated hardware reported by the second validation process 715 in the inventory of known shared chassis hardware, the chassis management controller 725 may update the inventory to denote additional use of the identified shared chassis hardware by the IHS of the second validation process 715.

In addition, the chassis management controller 725 also identifies any of the validated hardware reported by the second validation process 715 in the inventory of all validated hardware detected by the first IHS and reported, at 740, by the first validation process 705. If the chassis management controller 725 identifies any of the validated hardware reported by the second validation process 715 in the inventory of all validated hardware detected by the first IHS, the identified hardware is presumably a shared hardware component, since it has been reported as detected by both the first IHS and the second IHS. Any such hardware that is identified as detected by both the first IHS and the second IHS is added to the inventory of known shared chassis hardware. All other non-shared validated hardware that is reported by the second validation process 715 is added by the chassis management controller 725 to the inventory of validated hardware reported by the first validation process 705, thus building an inventory of all validated hardware reported by IHSs installed in the chassis, where no sharing of these hardware components is currently known. In this manner, the chassis management controller 725 may utilize reports of hardware validations and of hardware discrepancies in generating and building an inventory of the chassis hardware components that are being shared by IHSs installed in the chassis, and a separate inventory of all validated hardware that has been reported, but is not known to be shared chassis hardware.

The system of FIG. 7 may operate in this manner for any amount of time before modifications to the hardware installed in the chassis. As described, multiple IHSs, such as rack-mounted servers, may be installed in a chassis and may share chassis hardware such as power supply units 135, I/O controllers 145, network controllers 140, cooling resources

130 and data storage hardware 150, 155. In some instances, these shared chassis hardware components may be general-purpose computing components that are designed to be easily swapped between chassis, thus facilitating re-configuration of a chassis and replacement of shared chassis hardware without affecting, or minimally affecting, the operations of IHSs installed in the chassis. Accordingly, some types of shared chassis hardware may be occasionally added and removed from a chassis, and/or may be moved from one chassis to another.

In some instances, shared chassis hardware may be added or removed from a chassis without shutting down the other components of the chassis such that no IHSs are rebooted as part of the modifications to the shared chassis hardware. In other instances, once an administrator has completed modifications to shared chassis hardware, the chassis may be reassembled, powered and the IHSs installed in the chassis may be rebooted. As part of the initialization of the chassis, embodiments may provide an administrator with capabilities for initiating onboarding of the hardware modifications. This onboarding may re-initialize the validation process 705 of an IHS installed in the chassis. As described above, the validation process 705 may instead be initiated based on various detected conditions.

Once the validation process 705 of the IHS has been re-initialized, using the retrieved factory-provisioned inventory certificate for the IHS, the validation process 705 identifies any discrepancies between the detected hardware and the hardware specified in the factory-provisioned inventory certificate. The validation process 705 may additionally or alternatively consult any delta certificates that have been previously generated in response to validated modifications to the factory-installed hardware of the IHS. The validation process 705 determines whether all of the factory-installed hardware is detected or whether any hardware other than factory-installed hardware has been detected, and whether any differences can be validated by any delta certificates. As indicated in FIG. 7, at 765, the validation process 510 identifies a discrepancy between the detected hardware and the hardware validated by the available inventory certificate(s).

If any such discrepancy is detected, at 770, the validation process 705 notifies the chassis management controller 725 of the discrepancy. In some embodiments, validation process 705 may halt further booting of the IHS upon reporting a detected discrepancy to the chassis management controller 725. In some embodiments, validation process 705 may continue with various forms of restricted booting of the IHS, such as booting with any detected hardware that has not been successfully validated being quarantined. In some embodiments, the validation process 705 may boot while quarantining any subsystems for which the non-validated hardware is detected as being a subcomponent. For instance, in scenarios where a non-validated storage drive is detected by the validation process 705, embodiments may continue booting the IHS while quarantining any storage clusters, such as RAID clusters, and associated storage controllers 230*a* and SAS adapters 150, that the non-validated storage drive is a member of. As part of quarantining, these subsystems may maintained in an off state until a delta certificate is obtained that validates the detected discrepancy.

As described, in a data center environment, such validation discrepancies may be due to movement of shared chassis hardware. Accordingly, upon receipt of the discrepancy notification from the validation process 705, at 775, the chassis management controller 725 may be configured to delay further action on resolving the reported validation discrepancy on the basis that the discrepancy may be due to movement of shared chassis hardware, such that another IHS may report a corresponding discrepancy. In some embodiments, the chassis management controller 725 may hold for a configurable interval while monitoring for a corresponding validation notification from another IHS, or from another chassis. This configurable interval may be set to an hour, twenty-four hours or any other interval deemed suitable by administrators performing hardware maintenance in the datacenter, where the interval would be selected to accommodate an expected duration in which administrators can complete a transfer of a shared chassis hardware component.

In some instances, the chassis management controller 725 may issue a prompt or other notification to administrators when a validation discrepancy has been reported by an IHS, but no corresponding discrepancy has been received from another IHS during the applicable interval. In some instances, a shared chassis hardware component may be removed from a chassis without transferring it to another chassis, such as due to fault conditions or due to the hardware component no longer being supported. Accordingly, in some instances, a hardware discrepancy such as a missing hardware component may be reported by an IHS, but that hardware component will not be reported as a unrecognized hardware in another chassis. Accordingly, the prompt provided by embodiments may allow administrators to specify that the missing shared chassis hardware has been removed from circulation and is not being transferred. This may serve to validate the authenticity of the removal of the shared chassis hardware component, such that the chassis management controller 725 may initiate generation of a delta certificate for use by the IHS in validating this removal.

While the chassis management controller 725 is deferring action on the received discrepancy from the and is holding for notification of a corresponding validation discrepancy, as indicted in FIG. 7, at 780, the second validation process 715 of a different IHS installed in the chassis performs a hardware validation against the inventory certificate specifying its factory-installed hardware and any available delta certificates retrieved from the remote access controller 720 of that IHS. As described with regard to FIGS. 5 and 6, using the retrieved inventory certificate, the validation process 715 of the second IHS identifies any discrepancies between its detected hardware and the hardware specified in its factory-provisioned inventory certificate and in any available delta certificates. As indicated in FIG. 7, if any such discrepancy is detected, at 785, the validation process 715 notifies the chassis management controller 725 of the discrepancy.

As described, based on notifications of successfully validated hardware received form IHSs installed in a chassis, the chassis management controller 725 builds and maintains a listing of known shared chassis hardware. Accordingly, at 790, the chassis management controller 530 may resolve reported hardware discrepancies based on this listing of known shared chassis hardware. In one scenario, reports of successful hardware validations received from second validation processes 705 and 715 results in the chassis management controller 725 ascertaining that both of these IHSs have access to a shared network controller 140 installed in the chassis. These IHSs may operate using the shared network controller for any amount of time when one or both of these IHSs may report a validation discrepancy upon booting and detecting a different network controller from the chassis network controller that is was previously shared by the IHSs. In such instances, the discrepancy notifications provides the chassis management controller 725 with the identity of the prior chassis network controller that was not detected and the identity of the replacement network controller that has been detected, but is unrecognized.

Upon receipt of such a discrepancy notification, the chassis management controller 725 may consult its listing of known shared chassis hardware in order to determine whether the network controller that was not detected (i.e., reported as missing in the discrepancy notification) is one of the known shared chassis hardware components. In instances where the missing network controller is identified in this list of shared chassis hardware, the chassis management controller 725 can confirm that the reported validation discrepancies are due to movement of shared chassis hardware. In such instances, at 795, the chassis management controller 725 may provide the reporting validation processer 715 with notification that the missing network controller is due to movement of a shared network controller of the chassis such that this modification can be validated via a delta certificate.

In some embodiments, the chassis management controller 725 may request confirmation from an administrator when movement of shared chassis hardware has been identified, thus allowing the administrator to confirm the removal of the shared network controller from the chassis. In some instances, this confirmation by the administrator may specify that the removed network controller has been taken out of circulation. In some embodiments, the chassis management controller 725 may interface with any other known chassis management controllers that are configured according to embodiments in order to determine whether the removed shared chassis hardware has been moved to another chassis. As described, a rack may include multiple chassis, each including multiple IHSs and each including a chassis management controller 725 that manages the resources of the chassis that may be shared by the IHSs installed in that chassis.

In embodiments, upon confirming a hardware component reported as missing as being shared chassis hardware, the chassis management controller 725 may utilize inband and/or sideband signaling to query other chassis management controllers for possible reports of this missing hardware having been detected and reported as unrecognized by an IHS in another chassis. In such instances, the other chassis management controllers that are queried each consult their own listing of pending reported discrepancies in search of a validation discrepancy that reports an unrecognized hardware component that is the same hardware component reported as missing by the validation process 715. In such instances where the movement of shared chassis hardware can be confirmed, the chassis management controller 725 provides the validation process 715 that reported the discrepancy with a confirmation that the missing hardware component was shared chassis hardware that has been moved to a different chassis. The delta certificate the is generated in response to this confirmation may specify that the modification is due to movement of shared chassis hardware between chassis, thus indicating a low level of risk for this modification.

As described, the listing of known shared chassis hardware maintained by a chassis management controller 725 may not always specify all chassis hardware that is actually shared by IHSs. In the example where a shared network controller is being replaced with a new shared network controller, multiple IHSs may report hardware discrepancies based on the new, but unrecognized, network controller. As described, the chassis management controller 725 uses notifications of successful hardware validations reported by IHSs in order to build a listing of known shared chassis hardware. In instances where a discrepancy notification reports an unrecognized hardware component, the chassis management controller 725 may add to its list of shared chassis hardware when multiple discrepancy notifications report the same unrecognized hardware component, thus indicating that this added hardware is new shared chassis hardware. Upon making such a determination, the chassis management controller 725 may prompt an administrator to confirm a new network controller has been added as shared chassis hardware. The listing of shared chassis hardware maintained by the chassis management controller 725 may then be updated to reflect this new shared chassis network controller.

Configured in this manner, each chassis management controller 725 may maintain a listing of received discrepancy notifications that are regarded as active, and for which delta certificate generation remains pending. The chassis management controller 725 may hold received hardware discrepancy notifications received from IHSs installed in the chassis for a configurable interval while waiting for a corresponding discrepancy to be identified by another chassis management controller, thus confirming that the discrepancy resulted from movement of shared chassis hardware. Once a discrepancy notification has been held as active for a duration in excess of the configured interval, the chassis management controller 725 may seek manual validation of a reported hardware discrepancy, such that this discrepancy notification may then be removed from the list of active discrepancies maintained by the chassis management controller 725.

If the reported discrepancies are confirmed as due to movement of shared hardware, at 795, the chassis management controller 725 provides the reporting validation processes 705, 715 with a notification of the movement, where the notification may specify whether the movement was due to movement of the shared hardware to a different chassis, or due to the shared hardware being taken out of the relevant circulation of available hardware, or due to addition of new shared chassis hardware. Upon receiving such a notification from the chassis management controller 725, each respective validation process 705, 715 may initiate generation of delta certificates that can be used in validating the identified discrepancies.

In some embodiments, the cryptographic capabilities of a remote access controller, such as described with regard to FIG. 2, may include capabilities for generating cryptographic identity certificates, such that each of the respective remote access controllers 710, 720 may be configured generate delta certificates upon receiving notification from the chassis management controller 725 that a reported discrepancy is due to movement of shared chassis hardware. In other embodiments, the respective remote access controllers 710, 720 may request the generation of delta certificates from a certificate authority that may be the same as or related to the factory certificate authority 315 utilized in the generation of the factory-provisioned inventory certificates. In other embodiments, the respective remote access controllers 710, 720 may rely on another trusted certificate authority for generation of delta certificates that extend the validations provided by a factory-provisioned inventory certificate.

In generating the delta certificates, the respective remote access controllers 710, 720 may generate a digital signature for inclusion in the certificate, where the signature corresponds to the updated hardware inventory that is detected by the IHS, including the updated shared chassis hardware. In some embodiments, the digital signature included in a delta certificate may be generated based on the complete hardware inventory detected by the IHS, thus providing some level of redundancy relative to the factory-provisioned inventory certificate. In some embodiments, the digital signature included in a delta certificate may be generated based only on the modifications to the shared chassis hardware, such as a digital signature identifying a specific storage drive that has been added to a JBOD 155 storage system. In some embodiments, the delta certificates generated may indicate that modifications validated by the specific delta certificate correspond to a hardware transfer of shared chassis hardware, thus supporting less stringent and rapid validation of certain hardware discrepancies that pose low levels of risk.

Once generated, these delta certificates may then be used to validate authorized modifications to the factory-installed hardware of the IHS, specifically the movement of shared chassis hardware. However, as described, the chassis management controller 725 may be configured to defer providing any notification of confirmed movement of shared chassis hardware, and thus precluding the generation any delta certificates by the respective remote access controllers 710, 720, until that IHS has reported to the chassis management controller 530 an initial validation that indicates the IHS has been received with only authentic factory-installed hardware. In this manner, delta certificate generation is precluded until the IHS has been validated to have been initially booted using only factory-installed hardware identified in the original inventory certificate of the IHS. In this manner, validated movement of shared chassis hardware is supported, but only after establishing that an IHS has been received and initialized using only the factory-installed hardware.

As with the original inventory certificates, the respective remote access controllers 710 and 720 may store the generated delta certificate to a protected memory device or other protected persistent data storage. In embodiments where the delta certificate is not generated directly by the IHS, the respective remote access controllers 710 and 720 may validate received delta certificates, such as through confirmation that the delta certificate has been derived from the factory-provisioned inventory certificate maintained by the remote access controller, and such as through challenges issued to the certificate authority that generated the delta certificates.

With the delta certificates generated and stored for use by the IHSs reporting discrepancies, an administrator may be notified that the movement of shared chassis hardware has been detected and that delta certificates for validating the authenticity of these modifications has been generated and stored. At this point, any IHSs reporting discrepancy notifications are ready for use without any of the restrictions or limitations described above, now using the modified shared chassis hardware. Going forward, validation of the hardware detected by the IHS may proceed according to the procedures of FIGS. 5 and 6, with any identified discrepancies from the factory-installed inventory evaluated for authenticity using the stored original inventory certificate and/or delta certificate. As additional shared chassis hardware is moved, delta certificates may be invalidated and/or additional delta certificates may be generated.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A system that comprises:

a first Information Handling System (IHS) installed in a chassis, wherein the first IHS is configured to:

execute, in a pre-boot validation environment of the first IHS, instructions validated within a hardware root of trust of the first IHS, to validate hardware detected by the first IHS as factory-installed based on an inventory specified in a first factory-provisioned inventory certificate, wherein the first factory-provisioned inventory certificate is signed by the first IHS with a private key of a keypair generated by the first IHS; and notify a chassis controller when the hardware detected by the first IHS is validated as factory-installed based on the first inventory certificate;

a second IHS installed in the chassis, wherein the second IHS is configured to:

execute, in a pre-boot validation environment of the second IHS, instructions validated within a hardware root of trust of the second IHS to validate hardware detected by the second IHS as factory-installed based on an inventory specified in a second factory-provisioned inventory certificate, wherein the second factory-provisioned inventory certificate is signed by the second IHS with a private key of a keypair generated by the second IHS; and notify the chassis controller when the hardware detected by the second IHS is validated as factory-installed based on the second inventory certificate; and the chassis comprising a plurality of chassis hardware components and further comprising the chassis controller that is configured to:

based on notifications of validated hardware received from the first IHS and the second IHS, maintain an inventory of chassis hardware components that are shared by the first IHS and the second IHS; and in response to a notification of a failure to validate detected hardware as factory-installed by the first IHS or the second IHS, use the inventory to determine when the validation failure is due to movement of a chassis hardware component that is shared.

2. The system of claim 1, wherein the first IHS is further configured to: notify the chassis controller when the hardware detected by the first IHS is not validated as factory-installed.

3. The system of claim 2, wherein the notification specifies a missing factory-installed hardware component that was not detected.

4. The system of claim 2, wherein the notification specifies an unrecognized hardware component that is not a factory-installed hardware component of the first IHS.

5. The system of claim 2, wherein the first IHS is configured to halt further boot upon notification of the chassis controller of the hardware detected by the first IHS that is not validated as factory-installed.

6. The system of claim 5, wherein the first IHS is configured to continue boot when notified by the chassis controller that the hardware detected by the first IHS as not validated is due to movement of a chassis hardware component that is shared.

7. The system of claim 5, wherein the first IHS is configured to generate a delta certificate when notified by the chassis controller that the hardware detected by the first IHS as not validated is due to movement of a chassis hardware component that is shared.

8. The system of claim 1, wherein the first factory-provisioned inventory certificate is stored to a persistent memory of the first IHS during the factory-provisioning of the first IHS and wherein the second factory-provisioned inventory certificate is stored to a persistent memory of the second IHS during the factory-provisioning of the second IHS.

9. The system of claim 3, wherein the chassis controller is configured to query an other chassis controller when notified that the hardware detected by the first IHS as not validated is due to the missing factory-installed hardware component.

10. The system of claim 9, wherein the chassis controller determines when the validation failure is due to movement of a chassis hardware component to another chassis based on information provided in response to a query to the other chassis controller.

11. A method for validating transfer of a hardware component shared by a first Information Handling System (IHS) and a second IHS installed in a chassis, the method comprising:

executing, in a pre-boot validation environment of the first IHS, instructions validated within a hardware root of trust of the first IHS, for validating hardware detected by the first IHS as factory-installed based on an inventory specified in a first factory-provisioned inventory certificate, wherein the first factory-provisioned inventory certificate is signed by the first IHS with a private key of a keypair generated by the first IHS;

notifying a chassis controller when the hardware detected by the first IHS is validated as factory-installed based on the first inventory certificate;

executing, in a pre-boot validation environment of the second IHS, instructions validated within a hardware root of trust of the second IHS, for validating hardware detected by the second IHS as factory-installed based on an inventory specified in a second factory-provisioned inventory certificate, wherein the second factory-provisioned inventory certificate is signed by the second IHS with a private key of a keypair generated by the second IHS;

notifying the chassis controller when the hardware detected by the second IHS is validated as factory-installed based on the second inventory certificate;

based on notifications of validated hardware received from the first IHS and the second IHS, maintaining, by the chassis controller, an inventory of chassis hardware components that are shared by the first IHS and the second IHS; and in response to a notification of a failure to validate detected hardware as factory-installed by the first IHS or the second IHS, using, by the chassis controller, the inventory to determine when the validation failure is due to movement of a chassis hardware component that is shared.

12. The method of claim 11, further comprising notifying the chassis controller when the hardware detected by the first IHS is not validated as factory-installed.

13. The method of claim 12, wherein the notification specifies a missing factory-installed hardware component that was not detected.

14. The method of claim 12, wherein the notification specifies an unrecognized hardware component that is not a factory-installed hardware component of the first IHS.

15. The method of claim 11, further comprising halting further booting of the first IHS upon notifying the chassis controller of the hardware detected by the first IHS that is not validated as factory-installed.

16. The method of claim 15, further comprising continuing booting the first IHS when notified by the chassis controller that the hardware detected by the first IHS as not validated is due to movement of a chassis hardware component that is shared.

17. The method of claim 15, further comprising generating, by the first IHS, a delta certificate when notified by the chassis controller that the hardware detected by the first IHS as not validated is due to movement of a chassis hardware component that is shared.

18. A computer-readable storage device having instructions stored thereon for validating transfer of a hardware component shared by a first Information Handling System (IHS) and a second IHS installed in a chassis, wherein execution of the instructions by one or more processors of the chassis causes the chassis to:

receive a notification when hardware detected by the first IHS is validated as factory-installed based on an inventory specified in a first factory-provisioned inventory certificate, based, at least in part, upon instructions validated within a hardware root of trust of the first IHS, wherein the validated instructions are executed in a pre-boot validation environment of the first IHS, and wherein the first factory-provisioned inventory certificate is signed by the first IHS with a private key of a keypair generated by the first IHS;

receive a notification when hardware detected by the second IHS is validated as factory-installed based on an inventory specified in a second factory-provisioned inventory certificate, based, at least in part, upon instructions validated within a hardware root of trust of the second IHS, wherein the validated instructions are executed in a pre-boot validation environment of the second IHS, and wherein the second factory-provisioned inventory certificate is signed by the second IHS with a private key of a keypair generated by the second IHS;

based on notifications of validated hardware received from the first IHS and the second IHS, maintain an inventory of chassis hardware components that are shared by the first IHS and the second IHS; and in response to a notification of a failure to validate detected hardware as factory-installed by the first IHS or the second IHS, use the inventory to determine when the validation failure is due to movement of a chassis hardware component that is shared.

19. The computer-readable storage device of claim 18, wherein the chassis is further configured to query an other chassis controller when notified that hardware detected by the first IHS as not validated is due to an unrecognized hardware component.

20. The computer-readable storage device of claim 19, wherein the chassis is further configured to determine when the validation failure is due to movement of a chassis hardware component to another chassis based on information provided in response to a query to the other chassis controller.

* * * * *